United States Patent
Young et al.

(10) Patent No.: US 10,106,047 B2
(45) Date of Patent: Oct. 23, 2018

(54) ELECTRONIC CONTROLS FOR BATTERY-POWERED RIDE-ON VEHICLE

(71) Applicant: RADIO FLYER INC., Chicago, IL (US)

(72) Inventors: Matthew E. Young, Chicago, IL (US); Cameron Eckert, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 15/428,675

(22) Filed: Feb. 9, 2017

(65) Prior Publication Data
US 2017/0232846 A1 Aug. 17, 2017

Related U.S. Application Data

(60) Provisional application No. 62/294,519, filed on Feb. 12, 2016, provisional application No. 62/305,776, filed on Mar. 9, 2016.

(51) Int. Cl.
*B60L 1/08* (2006.01)
*B60L 11/18* (2006.01)
(Continued)

(52) U.S. Cl.
CPC .......... *B60L 11/1824* (2013.01); *B60K 1/02* (2013.01); *B60K 1/04* (2013.01); *B60K 26/02* (2013.01);
(Continued)

(58) Field of Classification Search
CPC .......... B60L 1/006; B60L 3/0046; B60L 3/06; B60W 10/26; B60W 20/10
(Continued)

(56) References Cited

U.S. PATENT DOCUMENTS 3,213,417 A 10/1965 Lewus
4,088,852 A 5/1978 VanDoren
(Continued)

FOREIGN PATENT DOCUMENTS

FR 2912929 8/2008

OTHER PUBLICATIONS

International Search Report and Written Opinion for related International Patent Application No. PCT/US17/17333, dated Jun. 12, 2017.
(Continued)

*Primary Examiner* — Jeffrey J Restifo
(74) *Attorney, Agent, or Firm* — Barnes and Thornburg LLP

(57) ABSTRACT

A battery powered ride-on vehicle is provided that has vehicle body, a plurality of wheels, a battery dock, a battery having battery terminals that mate with battery dock terminals, an accelerator switch and an accelerator switch controller, a power line to allow current to flow between the battery dock and the accelerator switch controller, a plurality of electrical components, an electronics controller in electrical communication with the accelerator switch controller and the electrical components, a power line connecting the electronics controller with the accelerator switch controller to allow current to flow between the accelerator switch controller and the electronics controller, a timer that calculates the time between actuations of the accelerator switch, and when the time between actuations of the accelerator switch is greater than a timer threshold the accelerator switch controller prevents a release of current to the electronics controller until the accelerator switch is actuated again.

17 Claims, 18 Drawing Sheets

(51) Int. Cl.
  *B60K 1/02* (2006.01)
  *B60K 1/04* (2006.01)
  *H02J 7/00* (2006.01)
  *B60K 26/02* (2006.01)
  *B60K 37/02* (2006.01)
  *B60K 37/06* (2006.01)
  *B60K 26/04* (2006.01)

(52) U.S. Cl.
  CPC .............. *B60K 37/02* (2013.01); *B60K 37/06* (2013.01); *B60L 11/1816* (2013.01); *B60L 11/1877* (2013.01); *H02J 7/007* (2013.01); *H02J 7/0027* (2013.01); *H02J 7/0044* (2013.01); *H02J 7/0045* (2013.01); *B60K 2001/0466* (2013.01); *B60K 2026/025* (2013.01); *B60K 2026/046* (2013.01); *B60K 2350/305* (2013.01); *B60K 2350/35* (2013.01); *B60L 2200/20* (2013.01); *B60L 2220/46* (2013.01); *B60L 2230/12* (2013.01); *B60L 2230/40* (2013.01); *B60L 2240/14* (2013.01); *B60L 2250/26* (2013.01)

(58) Field of Classification Search
  USPC ......... 180/65.31, 65.8, 65.29, 65.1; 320/133, 320/155
  See application file for complete search history.

(56) References Cited

U.S. PATENT DOCUMENTS

| | | | |
|---|---|---|---|
| 4,772,765 A | 9/1988 | Markle | |
| 5,492,190 A * | 2/1996 | Yoshida | B60K 6/28 180/65.245 |
| 5,764,009 A | 6/1998 | Fukaya et al. | |
| 5,816,352 A | 10/1998 | Hacker | |
| 5,982,152 A * | 11/1999 | Watanabe | H01M 10/625 320/137 |
| 7,000,718 B2 * | 2/2006 | Adachi | B60K 6/26 180/65.235 |
| 7,344,430 B2 | 3/2008 | Hasty | |
| 7,438,148 B1 | 10/2008 | Crea | |
| 7,521,824 B2 * | 4/2009 | Osawa | H02H 3/027 307/130 |
| 8,050,851 B2 * | 11/2011 | Aoki | B60K 6/445 701/112 |
| 8,072,309 B2 | 12/2011 | Kraimer | |
| 8,258,742 B2 * | 9/2012 | Funakoshi | H02J 7/1446 320/104 |
| 8,305,018 B2 * | 11/2012 | Okamura | B60K 6/445 318/370 |
| 8,583,308 B2 * | 11/2013 | Miyazaki | B60L 1/003 701/22 |
| 8,612,112 B2 * | 12/2013 | Ueoka | B60W 50/10 701/99 |
| 8,831,803 B2 * | 9/2014 | Yamamoto | B60W 20/13 701/22 |
| 9,030,165 B2 * | 5/2015 | Kawai | B60R 16/033 320/108 |
| 9,475,480 B2 * | 10/2016 | Ishishita | B60L 11/1862 |
| 9,539,903 B2 * | 1/2017 | Kinomura | B60L 11/123 |
| 9,627,911 B2 * | 4/2017 | Kinomura | B60L 11/1816 |
| 9,678,495 B2 * | 6/2017 | Fushiki | B60L 3/12 |
| 9,768,631 B2 * | 9/2017 | Yamanaka | B60L 11/1805 |
| 9,895,979 B2 * | 2/2018 | Mitsutani | B60L 11/02 |
| 9,919,710 B2 * | 3/2018 | Murata | B60L 11/123 |
| 9,994,116 B2 * | 6/2018 | Schlegel | H02J 7/007 |
| 10,017,169 B1 * | 7/2018 | Harvey | B60T 1/062 |
| 10,038,205 B2 * | 7/2018 | Wake | H01M 8/04097 |
| 2007/0034433 A1 | 2/2007 | Gabriele | |
| 2009/0139785 A1 | 6/2009 | Hoogenraad | |
| 2009/0174363 A1 | 7/2009 | Maher | |
| 2011/0258838 A1 | 10/2011 | McCabe et al. | |
| 2013/0337669 A1 | 12/2013 | Najera et al. | |
| 2014/0117946 A1 | 5/2014 | Muller | |
| 2016/0352120 A1 * | 12/2016 | Lovett | H02J 7/0047 |
| 2016/0362013 A1 * | 12/2016 | Gibeau | B60L 11/1844 |
| 2017/0028853 A1 * | 2/2017 | Elshaer | B60L 11/182 |
| 2017/0080814 A1 * | 3/2017 | Dadras | H02J 50/90 |

OTHER PUBLICATIONS

International Search Report and Written Opinion for related International Patent Application No. PCT/US17/17328, dated Apr. 13, 2017.

nternational Search Report and Written Opinion for related International Patent Application No. PCT/US17/17336, dated Apr. 14, 2017.

International Search Report and Written Opinion for related International Patent Application No. PCT/US17/33476, dated Aug. 4, 2017.

* cited by examiner

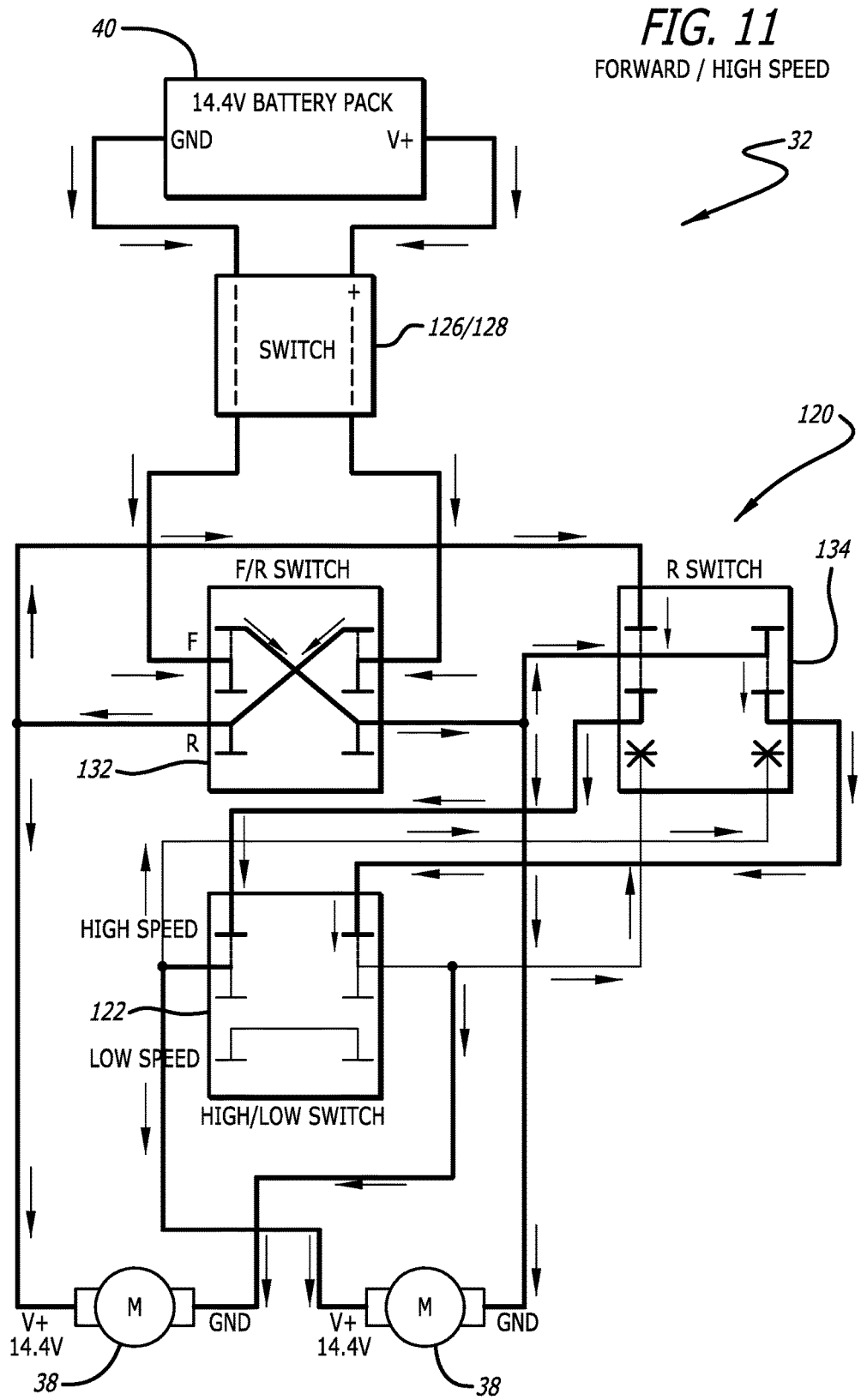

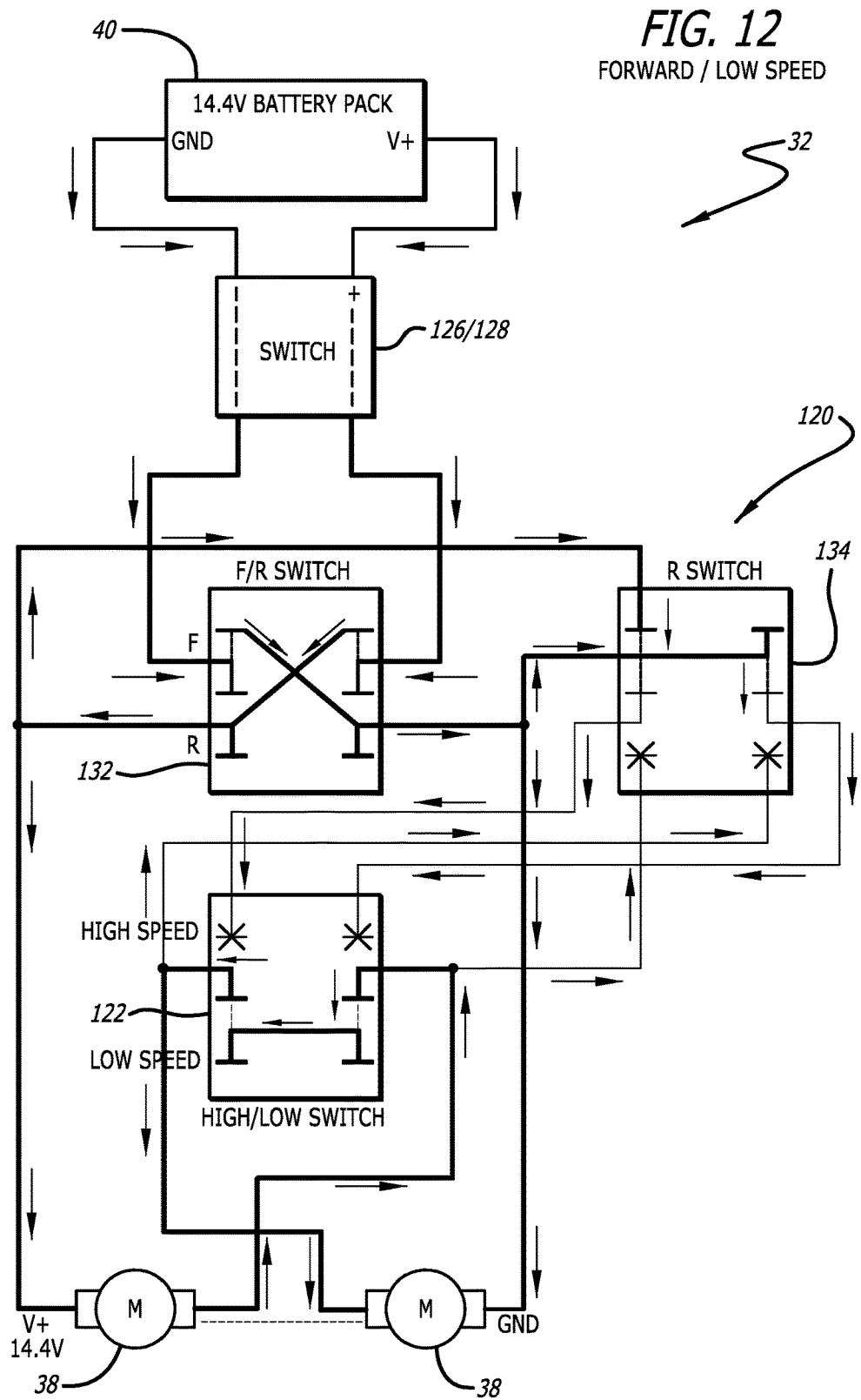

REVERSE / HIGH SPEED
LOOP 1

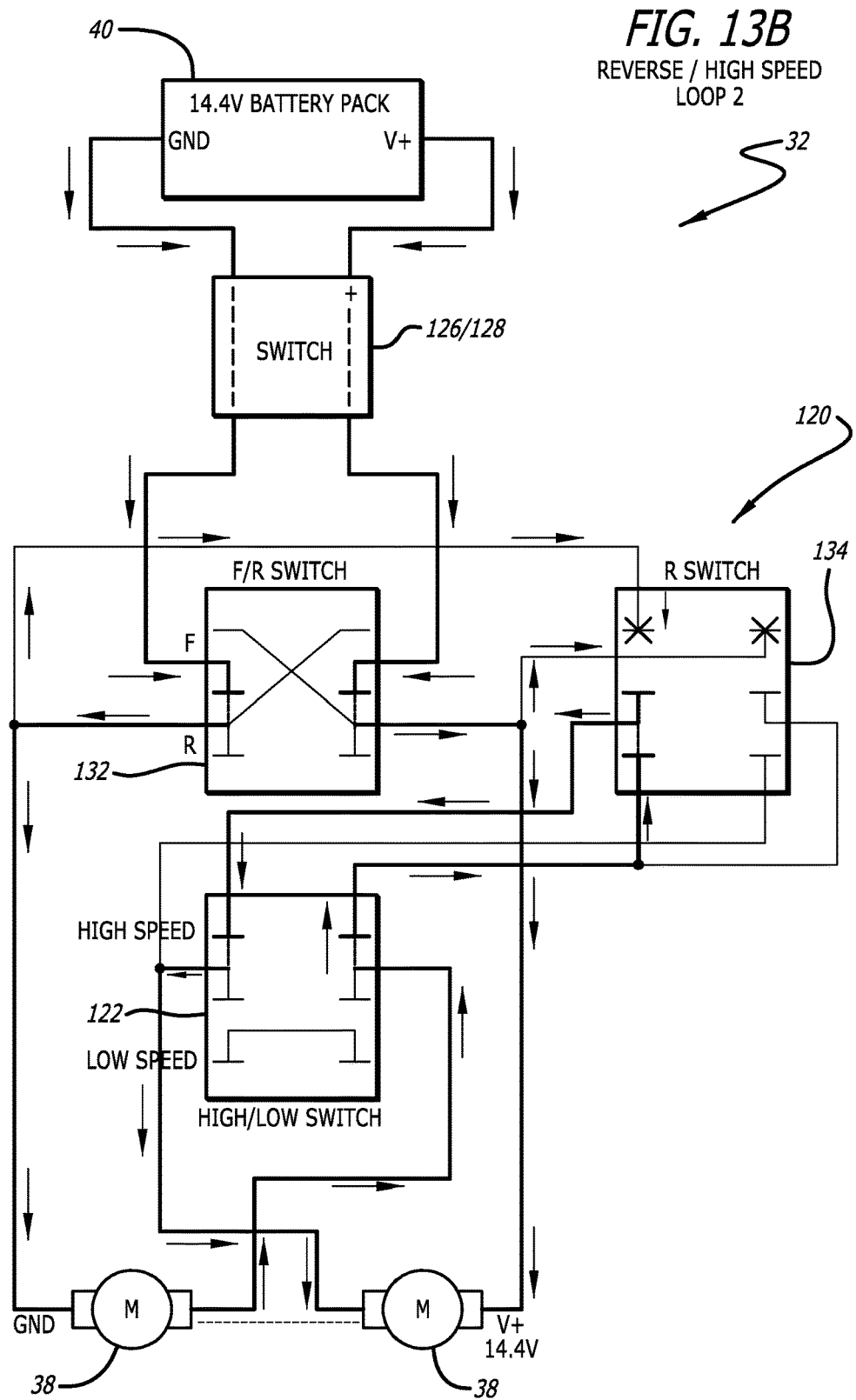

REVERSE / LOW SPEED

ELECTRONIC CONTROLS FOR BATTERY-POWERED RIDE-ON VEHICLE

CROSS-REFERENCE TO RELATED APPLICATIONS

This application claims the benefit of U.S. Provisional Patent Application No. 62/294,519, filed Feb. 12, 2016, and 62/305,776, filed Mar. 9, 2016, both of which are expressly incorporated herein by reference and made a part hereof.

FEDERALLY SPONSORED RESEARCH OR DEVELOPMENT

Not Applicable.

TECHNICAL FIELD

The present disclosure generally relates to a battery-powered vehicle, and in particular, to electronic controls for a battery-powered ride-on vehicle.

BACKGROUND

Battery powered ride-on vehicles are known. However, standard battery powered ride-on vehicles have numerous deficiencies and limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a battery-powered ride-on vehicle.

The disclosed technology further relates to a battery-powered vehicle, comprising: a vehicle body; a plurality of wheels supporting the vehicle body; a motor connected to at least one of the plurality of wheels; a remote charging dock on an exterior of the vehicle body, the remote charging dock having remote charging terminals; a first controller in electrical communication with the remote charging dock; a battery port extending into the vehicle body, the battery port having a battery dock and battery dock terminals; a second controller in electrical communication with the battery dock; a first wiring harness connecting the remote charging dock with the battery dock, wherein the first wiring harness has a power line to allow current to flow between the battery dock and the remote charging dock, and a communication line in the first wiring harness to allow data to be transmitted between the first controller and the second controller; a charger having a charger plug and associated charger terminals; and, a removable and rechargeable battery having battery terminals, wherein the battery is configured to be charged in the battery port when (a) the battery is positioned in the battery port and the battery terminals electrically and mechanically mate with the battery dock terminals, and (b) when the charger terminals of the charger are connected to the remote charging terminals of the remote charging dock, and wherein the battery is configured to be charged remote from the vehicle when (a) the battery is removed from the battery port and the battery terminals electrically and mechanically mate with the charger terminals for charging outside the battery port.

The disclosed technology further relates to a battery-powered vehicle, comprising: a vehicle body; a plurality of wheels supporting the vehicle body; a motor connected to at least one of the plurality of wheels; a battery port having a battery dock and battery dock terminals; a remote charging dock on an exterior of the vehicle body, the remote charging dock having remote charging terminals; a charger having a charger plug and associated charger terminals; and, a removable and rechargeable battery having battery terminals, wherein the battery is configured to be positioned in the battery port for charging in the battery port and to have the battery terminals electrically and mechanically mate with the battery dock terminals, and wherein the battery is configured to be removed from the battery port and to have the battery terminals electrically and mechanically mate with the charger terminals for charging outside the battery port.

The disclosed technology further relates to a battery-powered vehicle, comprising: a vehicle body; a plurality of wheels supporting the vehicle body; a motor connected to at least one of the plurality of wheels; a battery port having a battery dock and battery dock terminals; a remote charging dock on an exterior of the vehicle body, the remote charging dock having remote charging terminals; a first wiring harness connecting the remote charging dock with the battery dock, wherein the first wiring harness has a power line to allow current to flow between the battery dock and the remote charging dock, and a communication line in the first wiring harness to allow data to be transmitted between the battery dock and the remote charging dock; a charger having a charger plug and associated charger terminals; a rechargeable battery having battery terminals, wherein the battery is configured to be positioned in the battery port for charging in the battery port and to have the battery terminals electrically and mechanically mate with the battery dock terminals; a pedal switch, a pedal switch controller, and a second wiring harness connecting the pedal switch controller with a second controller in the battery dock, wherein the second wiring harness has a power line to allow current to flow between the battery dock and the pedal switch controller, and a communication line in the second wiring harness to allow data to be transmitted between the second controller in the battery dock and the pedal switch controller.

The disclosed technology further relates to a battery-powered vehicle having a first motor connected to a first wheel and a second motor connected to a second wheel.

The disclosed technology further relates to a battery-powered vehicle wherein the charger terminals and the battery dock terminals have a first terminal configuration, wherein the remote charging terminals and the battery terminals have a second terminal configuration, wherein the first terminal configuration is different from the second terminal configuration, and wherein the terminals of the first terminal configuration are adapted to mate with the terminals of the second terminal configuration.

The disclosed technology further relates to a battery-powered vehicle having a third controller in the charger and a fourth controller in the battery, the third controller being electrically connected to the first controller when the charger is plugged into the remote charging dock, and the fourth controller communicating with one of the second controller in the battery dock when the battery is connected to the battery dock, and the third controller in the charger.

The disclosed technology further relates to a battery-powered vehicle having a pedal switch, a pedal switch controller, and a second wiring harness connecting the pedal switch controller with a second controller in the battery dock, wherein the second wiring harness has a power line to allow current to flow between the battery dock and the pedal switch controller, and a communication line in the second wiring harness to allow data to be transmitted between the second controller in the battery dock and the pedal switch controller.

The disclosed technology further relates to a battery-powered vehicle wherein one of the second controller in the battery dock and the pedal switch controller prevents the release of current to all motors when the charger is connected to the remote charging dock. The disclosed technology further relates to a battery-powered vehicle wherein the charger terminals of the charger are connected to the remote charging terminals of the remote charging dock for charging the battery in the battery port.

The disclosed technology further relates to a battery-powered vehicle having a first wiring harness connecting the remote charging dock with the battery dock, wherein the first wiring harness has a power line to allow current to flow between the battery dock and the remote charging dock, and a communication line in the first wiring harness to allow data to be transmitted between the battery dock and the remote charging dock.

The disclosed technology further relates to a battery-powered vehicle having a first controller in the remote charging dock and a second controller in the battery dock, the communication line electrically connecting the first controller to the second controller. The disclosed technology further relates to a battery-powered vehicle having a third controller in the charger that monitors battery parameters based on data transmitted from the fourth controller to the third controller through the communication line. The disclosed technology further relates to a battery-powered vehicle wherein the third controller in the charger monitors battery parameters based on data transmitted from the fourth controller to the third controller when the battery terminals are electrically and mechanically connected with the charger terminals.

The disclosed technology further relates to a battery-powered vehicle wherein one of a second controller in the battery dock and the pedal switch controller prevents the release of current to the motor when the charger is connected to the remote charging dock.

The disclosed technology further relates to a ride-on vehicle having a speed controlled switching system, comprising: a vehicle body having a driver's seat for a rider; a plurality of wheels supporting the vehicle body; a motor connected to at least one of the plurality of wheels; a battery electrically connected to the motor; a direction switch assembly electrically connected between the battery and the motor, the direction switch assembly having a forward button, a reverse button, a first switch, a second switch, and a rocker plate between the forward and reverse buttons and the first and second switches; and, a speed switch electrically connected between the direction switch assembly and the motor, the speed switch being separate from the direction switch assembly, and the speed switch having a high speed setting and a low speed setting, wherein when the reverse button of the direction switch assembly is actuated it removes control of a speed of the motor from the speed switch, and wherein when the forward button of the direction switch assembly is actuated it causes the speed switch to control the speed of the motor.

The disclosed technology further relates to a ride-on vehicle having a speed controlled switching system, comprising: a vehicle body having a driver's seat for a rider; a plurality of wheels supporting the vehicle body; a motor connected to at least one of the plurality of wheels; a battery electrically connected to the motor; a direction switch assembly electrically connected between the battery and the motor, the direction switch assembly having a forward button and a reverse button adjacent the forward button; and, a speed switch electrically connected between the direction switch assembly and the motor, the speed switch being separate from the direction switch assembly, wherein when the reverse button of the direction switch assembly is actuated it removes control of a speed of the motor from the speed switch, and wherein when the forward button of the direction switch assembly is actuated it causes the speed switch to control the speed of the motor.

The disclosed technology further relates to a ride-on vehicle having a speed controlled switching system, comprising: a vehicle body having a driver's seat for a rider; a plurality of wheels supporting the vehicle body; a motor connected to at least one of the plurality of wheels; a battery electrically connected to the motor; a direction switch assembly electrically connected between the battery and the motor, the direction switch assembly having an independent forward button and an independent reverse button adjacent the forward button; and, a speed switch electrically connected between the direction switch assembly and the motor, the speed switch separate from the direction switch assembly, the speed switch having a low speed setting and a high speed setting, wherein the direction switch is proximal the driver's seat in the vehicle body, and wherein the speed switch is distal the driver's seat and generally not accessible by a rider seated in the driver's seat.

The disclosed technology further relates to a ride-on vehicle wherein the first switch of the direction switch assembly controls the polarity of the current sent to the motor. The disclosed technology further relates to a ride-on vehicle wherein when the first switch is in a first position the current provided to the motor has a first polarity, and when the first switch is in a second position the current provided to the motor has a second polarity opposite the first polarity.

The disclosed technology further relates to a ride-on vehicle wherein actuation of the forward button operates to actuate the first switch to a first position and to actuate the second switch to a first position, and wherein actuation of the reverse button operates to actuate the first switch to a second position and to actuate the second switch to a second position.

The disclosed technology further relates to a ride-on vehicle wherein the direction switch assembly is proximal the driver's seat in the vehicle body, and wherein the speed switch is distal the driver's seat and generally not accessible by a rider seated in the driver's seat.

The disclosed technology further relates to a ride-on vehicle having a second motor connected to at least one of the plurality of wheels. The disclosed technology further relates to a ride-on vehicle wherein a voltage is provided to the motors in parallel when the forward button is actuated and when the speed switch is in the high speed setting, wherein the voltage is provided to the motors in series when the forward button is actuated and when the speed switch is in the low speed setting, and wherein the voltage is provided to the motors in series when reverse button is actuated regardless of the setting of the speed switch. The disclosed technology further relates to a ride-on vehicle wherein the voltage observed by the motors is higher when provided in parallel than in series.

The disclosed technology further relates to a ride-on vehicle wherein the speed switch has a high speed setting and a low speed setting.

The disclosed technology further relates to a ride-on vehicle having a first motor and a second motor, wherein a voltage is provided to the motors in parallel when the forward button is actuated and when the speed switch is in the high speed setting, wherein the voltage is provided to the motors in series when the forward button is actuated and when the speed switch is in the low speed setting, and wherein the voltage is provided to the motors in series when reverse button is actuated regardless of the setting of the speed switch.

The disclosed technology further relates to a ride-on vehicle wherein the direction switch assembly is positioned within the cockpit of the vehicle body, and wherein the speed switch is positioned outside the cockpit of the vehicle body.

The disclosed technology further relates to a ride-on vehicle wherein when the reverse button is actuated the direction switch assembly causes a voltage observed by the motor to be that of the low speed setting regardless of the setting of the speed switch.

The disclosed technology further relates to a battery-powered vehicle, comprising: a vehicle body; a plurality of wheels supporting the vehicle body; a battery port in the vehicle body, the battery port having a battery dock and battery dock terminals, the battery port having a battery dock controller; a removable and rechargeable battery having battery terminals that electrically and mechanically mate with the battery dock terminals; an accelerator switch, an accelerator switch controller, and a wiring harness connecting the accelerator switch controller with the battery dock controller, wherein the wiring harness has (a) a power line to allow current to flow between the battery dock and the accelerator switch controller, and (b) a communication line to allow data to be transmitted between the battery dock controller and the accelerator switch controller; the accelerator switch controller having a timer; a dashboard having a plurality of electrical components, a dashboard controller in electrical communication with the accelerator switch controller and the electrical components, and a power line connecting the dashboard controller with the accelerator switch controller to allow current to flow between the accelerator switch controller and the dashboard controller; and, wherein the actuation of the accelerator switch operates to allow current to be provided from the battery to the dashboard controller, wherein the timer calculates the time between actuations of the accelerator switch, and wherein when the time between actuations of the accelerator switch is greater than a dashboard timer threshold the accelerator switch controller prevents the release of current to the dashboard controller until the accelerator switch is actuated again.

The disclosed technology further relates to a battery-powered vehicle, comprising: a vehicle body; a plurality of wheels supporting the vehicle body; a battery dock having battery dock terminals and a battery dock controller; a battery having battery terminals that electrically and mechanically mate with the battery dock terminals; an accelerator switch and an accelerator switch controller; a power line to allow current to flow between the battery dock and the accelerator switch controller; a plurality of electrical components, and an electronics controller in electrical communication with the accelerator switch controller and the electrical components; a dashboard power line connecting the electronics controller with the accelerator switch controller to allow current to flow between the accelerator switch controller and the electronics controller; one of the accelerator switch controller and the electronics controller having a timer; and, wherein actuation of the accelerator switch operates to allow current to be provided to the electronics controller, wherein the timer calculates the time between actuations of the accelerator switch, and wherein when the time between actuations of the accelerator switch is greater than a timer threshold, one of the battery dock controller, the accelerator switch controller and the electronics controller prevents the release of current to the electronics controller until the accelerator switch is actuated again.

The disclosed technology further relates to a battery-powered vehicle, comprising: a vehicle body; a plurality of wheels supporting the vehicle body; a battery dock having battery dock terminals and a battery dock controller; a battery having battery terminals that electrically and mechanically mate with the battery dock terminals; an accelerator switch and an accelerator switch controller; a power line to allow current to flow between the battery dock and the accelerator switch controller; a plurality of electrical components, and an electronics controller in electrical communication with the accelerator switch controller and the electrical components; a dashboard power line connecting the electronics controller with the accelerator switch controller to allow current to flow between the accelerator switch controller and the electronics controller; and, wherein a timer calculates the time between actuations of the accelerator switch, and wherein when the time between actuations of the accelerator switch is greater than a timer threshold, one of the battery dock controller, the accelerator switch controller and the electronics controller prevents a release of current to the dashboard controller until the accelerator switch is actuated again.

The disclosed technology further relates to a battery-powered ride-on vehicle wherein the motor is electrically connected to the accelerator switch controller.

The disclosed technology further relates to a battery-powered ride-on vehicle having a charging dock electrically connected with the battery dock, a charger having a charger plug and associated charger terminals adapted to be removably connected to the charging dock, wherein the battery is configured to be charged in the battery port when the battery terminals electrically and mechanically mate with the battery dock terminals and wherein the charger plug is connected to the charging dock, and wherein one of the battery dock controller and the accelerator switch controller prevents the release of current to the motor when the charger is connected to the charging dock.

The disclosed technology further relates to a battery-powered ride-on vehicle having a charging dock electrically connected with the battery dock, a charger having a charger plug and associated charger terminals adapted to be removably connected to the charging dock, wherein the battery is configured to be charged in the battery port when the battery terminals electrically and mechanically mate with the battery dock terminals and wherein the charger plug is connected to the charging dock, and wherein the accelerator switch controller allows the release of current to the dashboard controller when the charger is connected to the remote charging dock.

The disclosed technology further relates to a battery-powered ride-on vehicle having a voltage regulator that steps down a voltage from the accelerator switch controller to the dashboard controller.

The disclosed technology further relates to a battery-powered ride-on vehicle having a communication line to allow data to be transmitted between the battery dock controller and the accelerator switch controller.

The disclosed technology further relates to a battery-powered ride-on vehicle wherein actuation of the accelerator switch operates to allow current to be provided to the electronics controller.

The disclosed technology further relates to a battery-powered ride-on vehicle wherein the timer is incorporated into one of the accelerator switch controller, the battery dock controller and the electronics controller.

The disclosed technology further relates to a battery-powered ride-on vehicle having a communication line to allow data to be transmitted between the battery dock controller and the accelerator switch controller.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 11 is a schematic of a forward/reverse switching system connected to a power source and motors of a battery-powered vehicle, with the vehicle configured in the forward direction and in the high gear, according to one embodiment.

FIG. 12 is a schematic of a forward/reverse switching system connected to a power source and motors of a battery-powered vehicle, with the vehicle configured in the forward direction and in the low gear, according to one embodiment.

FIG. 13B is schematic of a forward/reverse switching system connected to a power source and motors of a battery-powered vehicle, with the vehicle configured in the reverse direction and in the high gear, according to another embodiment.

DETAILED DESCRIPTION

Figure 1:
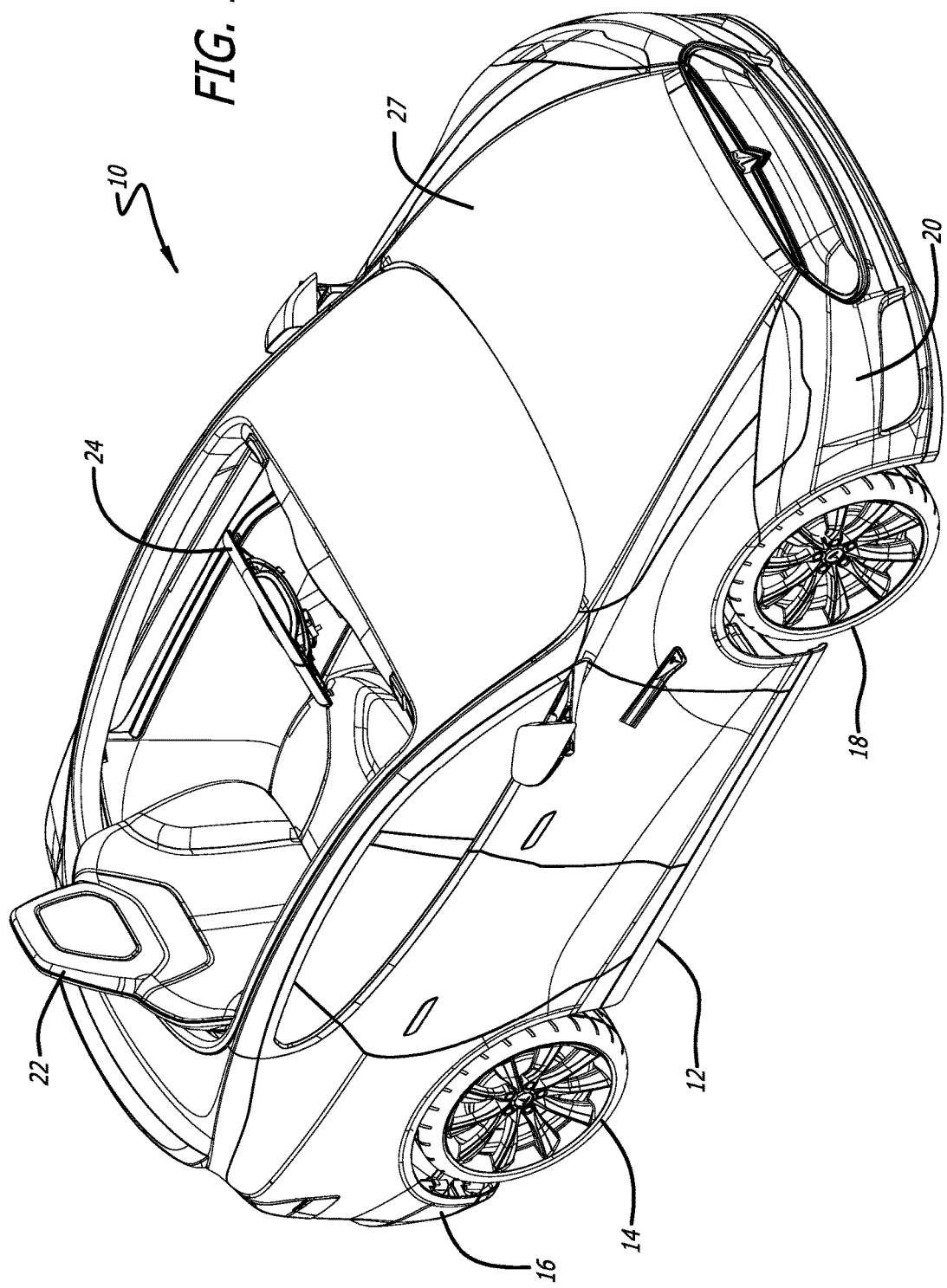
FIG. 1 is a front perspective view of a battery-powered vehicle according to one embodiment.

While the ride-on vehicle discussed herein is susceptible of embodiments in many different forms, there is shown in the drawings, and will herein be described in detail, preferred embodiments with the understanding that the present description is to be considered as an exemplification of the principles of the ride-on vehicle and are not intended to limit the broad aspects of the disclosure to the embodiments illustrated.

Figure 2:
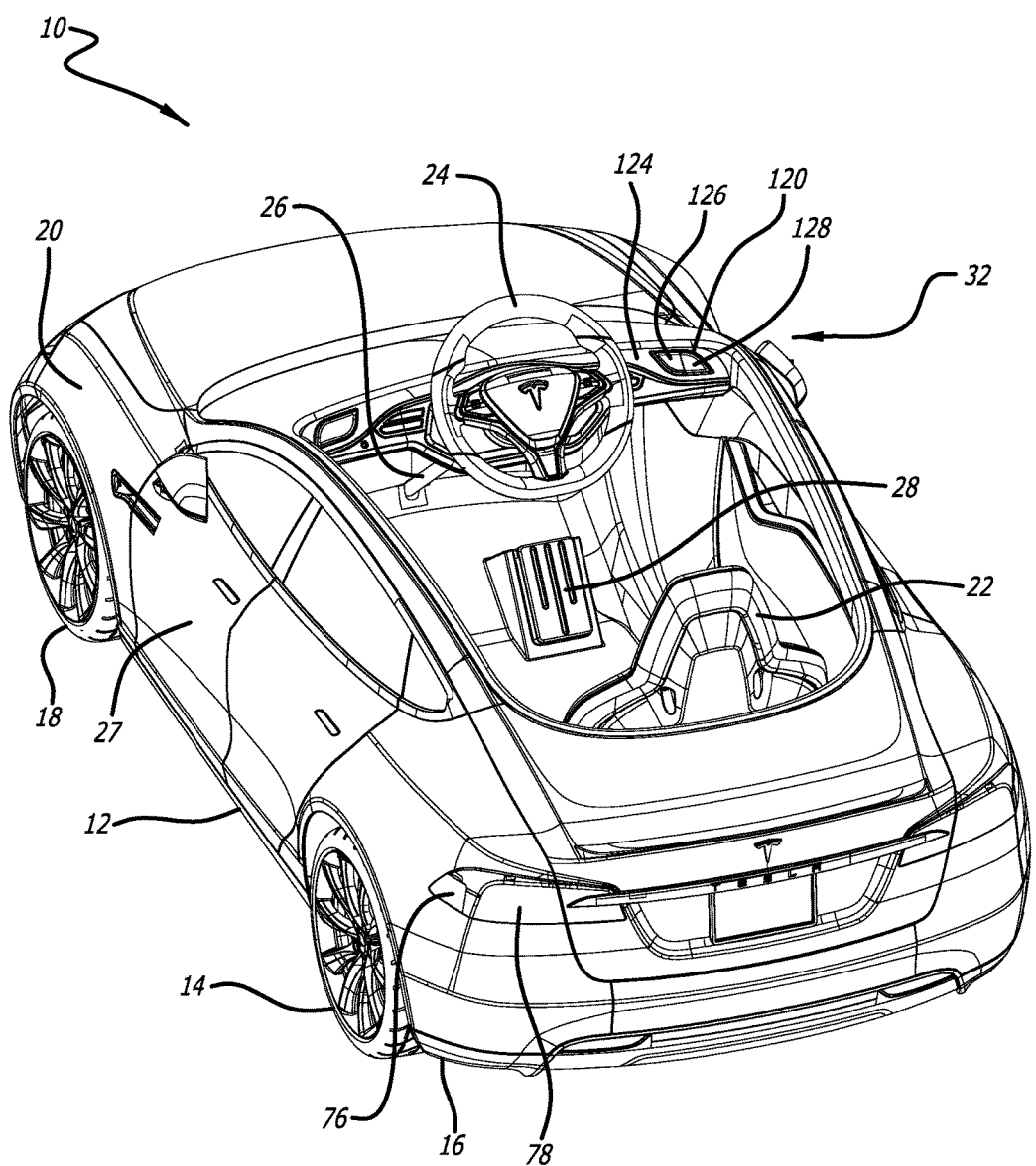
FIG. 2 is a rear perspective view of the battery-powered vehicle of FIG. 1.

The battery-powered vehicle is a ride-on vehicle that is preferably used by children and adolescents, but in alternate embodiments may be used by larger individuals, such as adults. Referring now to FIGS. 1, 2 and 7, one embodiment the overall battery-powered vehicle 10 is shown. The battery-powered vehicle 10 may include a frame 12 supported by a plurality of wheels, including in one embodiment, a pair of rear wheels 14 at the rearward portion 16 of the frame 12, and a pair of front wheels 18 at the forward portion 20 of the frame 12. Additionally, the vehicle 10 has a vehicle body 27 supported by the wheels and the frame. The vehicle 10 also preferably includes a seat 22 to support the rider, a steering wheel 24 operably connected to the front wheels 18 via a steering column 26 to assist in steering the vehicle 10, an accelerator 28, and one or more motors 38. In a preferred embodiment a pair of motors 38 is provided. In one embodiment, the motor(s) are electrically connected to the accelerator 28, and preferably to an accelerator switch controller 29. In one embodiment, a first motor 38 is provided for a first one of the rear wheels 14 and a second motor 38 is provided for a second of the rear wheels 14. Alternately, only one motor may be provided and it may drive two or more wheels, or alternately yet, only one motor may be provided and it may drive only one wheel of the vehicle. The motors 38 may be connected to the frame 12 and underneath the seat 22, as shown in FIG. 7, and also are mechanically connected to the wheel(s). As explained herein, in one embodiment when the user depresses the accelerator 28, a battery 40, which is electrically connected to the motor(s), supplies current to the motor(s) 38 to have the motor(s) 38 rotate the rear wheels 14 to drive the vehicle 10. Additionally, after the accelerator 28 is depressed the battery 40 will also supply current to the various electronics on the vehicle 10 for a period of time. As further discussed herein as well, the vehicle 10 may be driven in both the forward mode to propel the vehicle 10 forward, and in the reverse mode to propel the vehicle 10 backwards. In various embodiments, the battery-powered vehicle 10 may also have a charging system 30, as shown in FIGS. 3-6 and 14-16, a forward/reverse switching system 32, as shown in FIGS. 2 and 8-13, a motor disabling system 34, as shown in FIG. 17, and an electronics wakeup system 36, as shown schematically in FIGS. 14 and 18.

Referring now to FIGS. 14-17, in one embodiment, aspects of the charging system 30 for the battery-powered vehicle 10 comprise one or more of the battery 40, a battery dock 42, a remote charging dock 44, and a charger 46.

In one embodiment, each of the charger 46, the remote charging dock 44, the battery dock 42 and the battery 40 preferably has a circuit board or controller in electrical communication therewith that receives data, transmits data, calculates data and/or makes calculations and decisions using the data, and receives and transmits current/power. For example, in one embodiment, a remote charging dock circuit board 45, also referred to as a first controller 45, is in electrical communication with the remote charging dock 44. Similarly, in one embodiment a battery dock circuit board 43, also referred to as a second controller 43, is in electrical communication with the battery dock 42. Further, in one embodiment, the charger 46 has a charger circuit board 47, which is also referred to as a third controller 47. And, in one embodiment, the battery plug 56 of the battery 40 has a battery or battery plug circuit board 57, also referred to as a fourth controller 57. In one embodiment the pedal switch 28 has a pedal switch circuit board 29, which is also referred to as a pedal switch controller 29. Finally, the electronics in the cockpit of the vehicle 10, such as on the vehicle's dashboard or other locations, also may have an electronics controller 95.

The battery 40 is preferably a removable and rechargeable battery 40 having a battery plug 56 that has a third set of terminals 58, also referred to herein as battery terminals 58, in a terminal arrangement. In one embodiment the terminal arrangement of the third set of terminals 58 of the battery plug 56 is that of a male terminal arrangement. The battery 40 also has a battery circuit board 57, also referred to as a fourth controller 57. The fourth controller 57 communicates with one of the second controller in the battery dock when the battery is connected to the battery dock, and the third controller in the charger. Further, when the battery is connected directly to the charger, the fourth controller communicates with the third controller in the charger via communication line 80. The third controller in the charger monitors battery parameters based on data transmitted from the fourth controller to the third controller through the communication line.

In one embodiment the battery 40 is comprised of a series of rechargeable battery cells. Further, in one embodiment the battery 40 may be a rechargeable lithium ion battery, however other types of batteries, including other types of rechargeable batteries, may be provided. In one embodiment, the battery 40 has a first end 41a and a second end 41b. A handle 41c may be provided and located at the second end 41b of the battery 40. In a preferred embodiment, the battery terminals 58 are provided at the first end 41a of the battery 40. As explained herein, the battery 40 is configured to be charged in the battery port 72 when (a) the battery 40 is positioned in the battery port 72 and the battery terminals 58 electrically and mechanically mate with the battery dock terminals 54, and (b) when the charger terminals 50 of the charger 46 are connected to the remote charging terminals 62 of the remote charging dock 44. The battery 40 is also configured to be charged remote from the vehicle 10 when the battery 10 is removed from the battery port 72 and the battery terminals 58 electrically and mechanically mate with the charger terminals 50 for charging outside the battery port 72.

Figure 14:
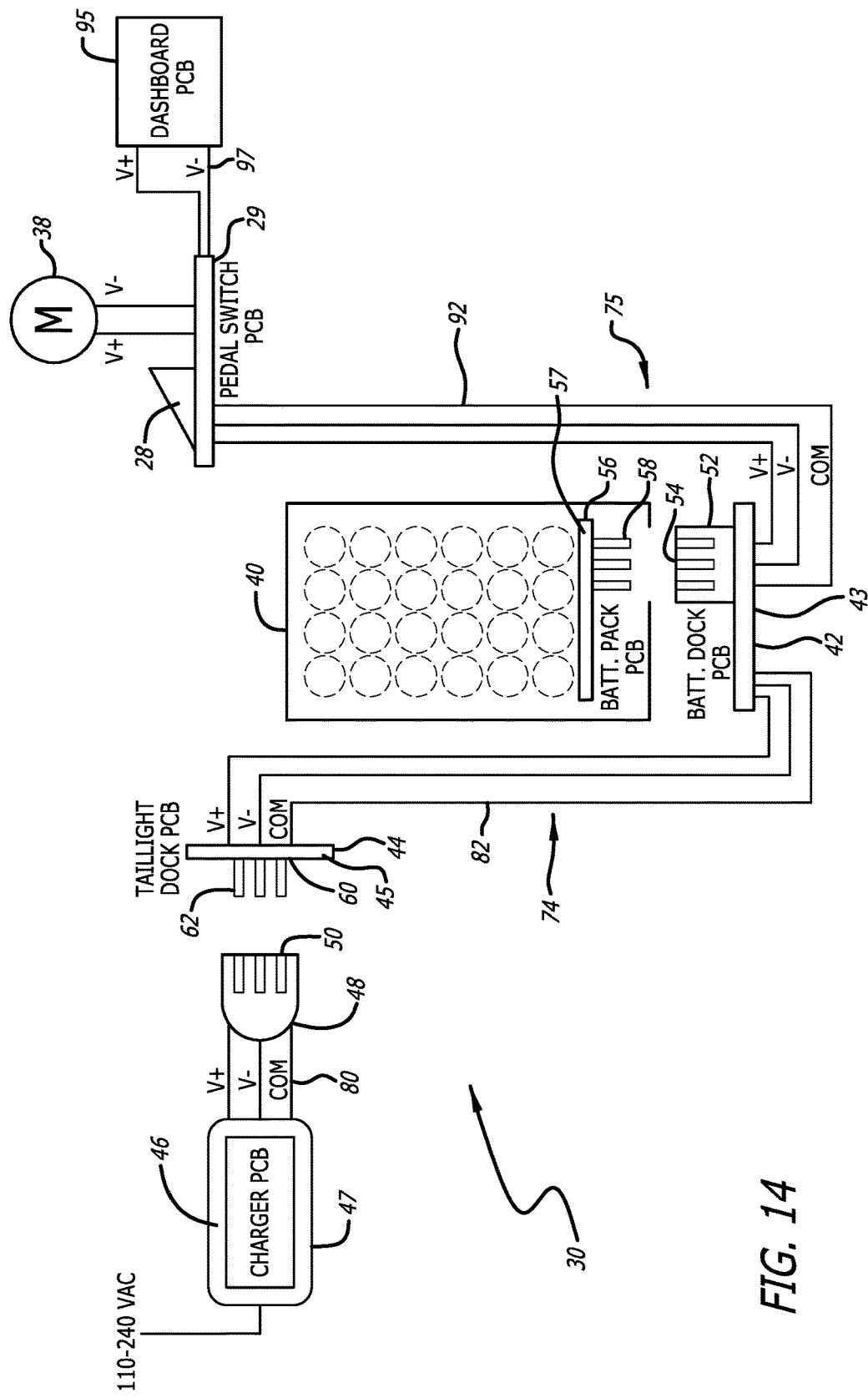
FIG. 14 is a schematic showing a charging system and a dashboard electronics system for a battery-powered vehicle according to one embodiment, with the battery disconnected from the battery dock and the charger disconnected from the charging dock.

As shown in FIG. 14, in one embodiment the terminal arrangement of the third set of terminals 58 of the battery plug 56 of the battery 40 is that of a male terminal arrangement. Similarly, in one embodiment the remote charging dock 44 has a remote charging plug 60 that has a fourth set of terminals 62 in a terminal arrangement. The fourth set of terminals 62 are also referred to as the remote charging terminals 62. In one embodiment the terminal arrangement of fourth set of terminals 62 of the remote charging plug 60 is also that of a male terminal arrangement. Accordingly, the terminal arrangement of the third set of terminals 58 of the battery plug 56 is preferably the same as the terminal arrangement on the fourth set of terminals 62 of the remote charging plug 60.

Also shown best in FIG. 14, in one embodiment the battery dock 42 has a battery dock plug 52 that has a second set of terminals 54 in a terminal arrangement. In one embodiment the terminal arrangement of the terminals 54 of the battery dock plug 52 is that of a female terminal arrangement. Similarly, the charger 46 of the charging system 30 preferably has a charger plug 48 and associated charger terminals 50, referred to as a first set of terminals 50, which are in a terminal arrangement. In one embodiment the terminal arrangement of the first set of terminals 50 on the charger plug 48 is that of a female terminal arrangement. Preferably, the terminal arrangement of the second set of terminals 54 on the battery dock plug 52, also referred to as the battery dock terminals 54, is the same as the terminal arrangement of the first set of terminals 50 on the charger plug.

Accordingly, in one embodiment, the charger terminals 50 and the battery dock terminals 54 have a first terminal configuration, and the remote charging terminals 62 and the battery terminals 58 have a second terminal configuration. The first terminal configuration is preferably different from the second terminal configuration, and most preferably the terminals of the first terminal configuration are adapted to mate with the terminals of the second terminal configuration.

Figure 5:
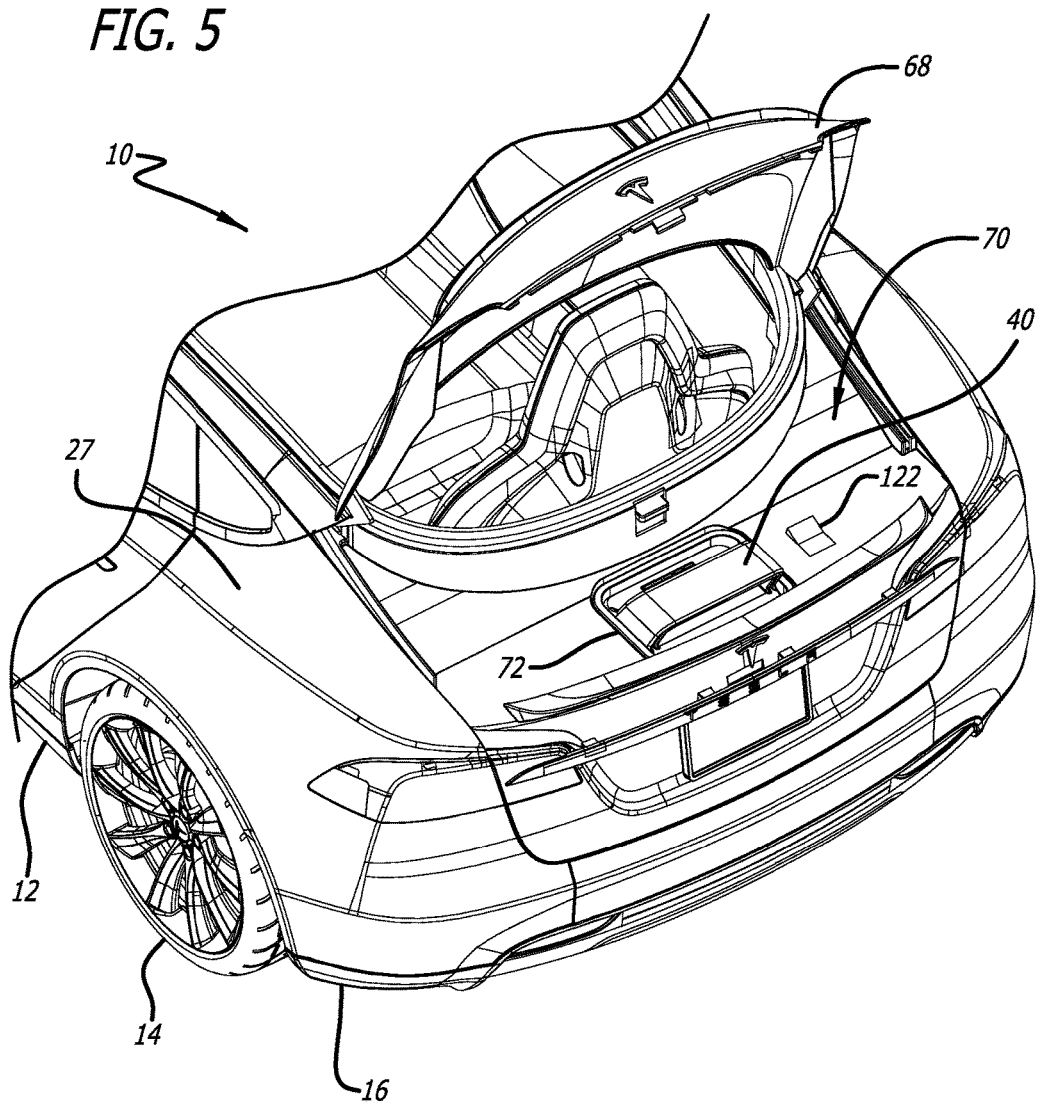
FIG. 5 is a top partial perspective view of a battery-powered vehicle according to one embodiment, with the trunk opened to show the battery and the high/low speed selector switch.
Figure 15:
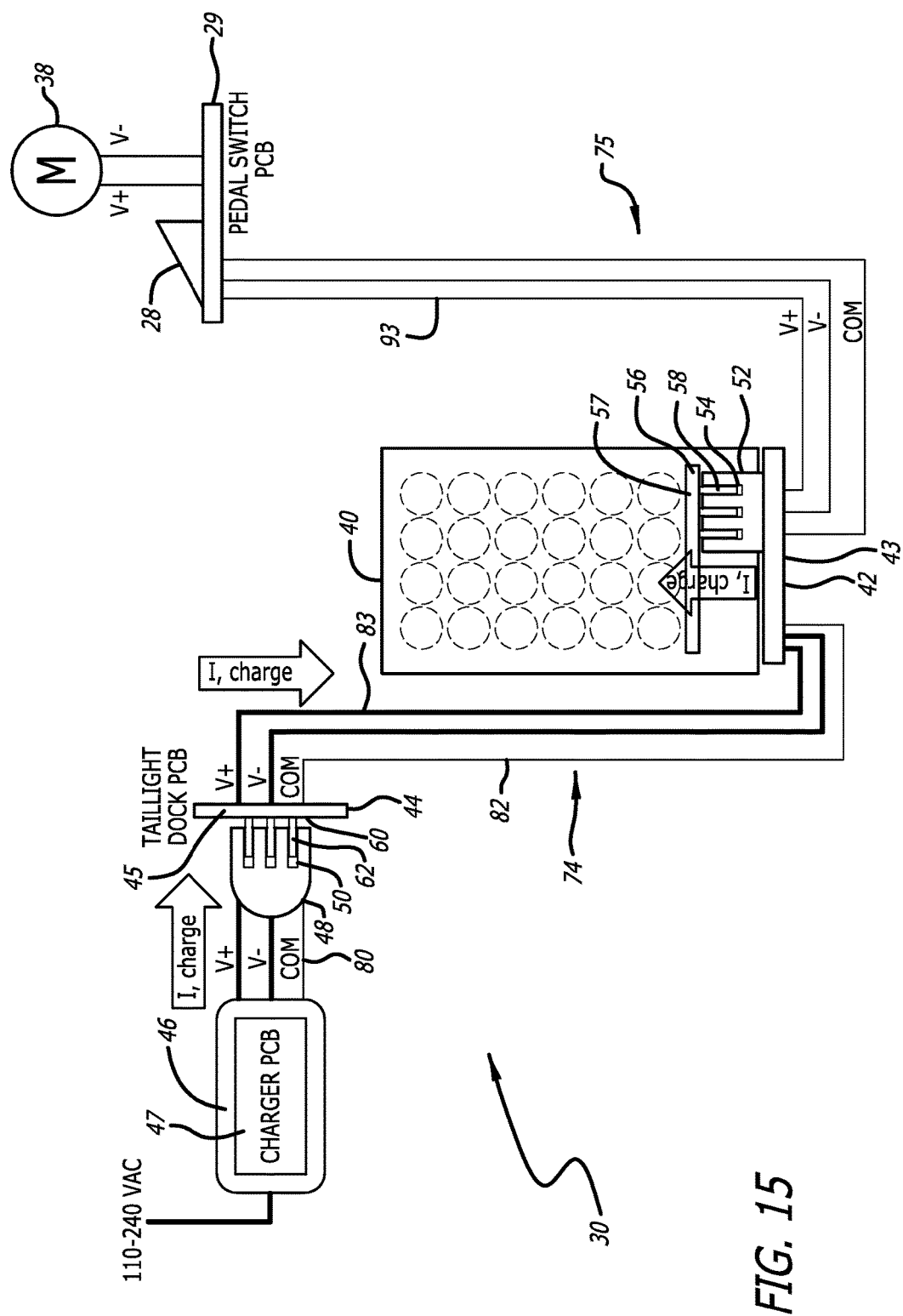
FIG. 15 is a schematic showing the charging system of FIG. 14, without the dashboard electronics system, with the battery connected to the battery dock and the charger connected to the charging dock.

As shown in the schematic of FIG. 15, the battery 40 for the battery-powered vehicle 10 may be charged while the battery 40 remains connected to the vehicle 10 and without removing the battery 40 from the vehicle 10. In one embodiment, the battery 40 is housed in a battery port 72 that may extend into the vehicle body 27, such as into the trunk 70 of the vehicle, as shown in FIG. 5, and in such an embodiment the battery port 72 is accessible by lifting the trunk hatch 68 of the vehicle 10. The battery port 72 preferably includes the battery dock 42 and the battery dock terminals 54. In such an embodiment, when the battery 40 is inserted into the battery housing or battery port 72 in the trunk 70 of the vehicle 10, the third set of terminals 58 on the battery plug 56 of the battery mate with the second set of terminals 54 on the battery dock plug 52 of the battery dock 42. Accordingly, in one embodiment, when the battery 40 is inserted into the battery port 72, the terminals 58 of the battery 40 electrically connect to the terminals 54 on the battery dock 42.

Figure 3:
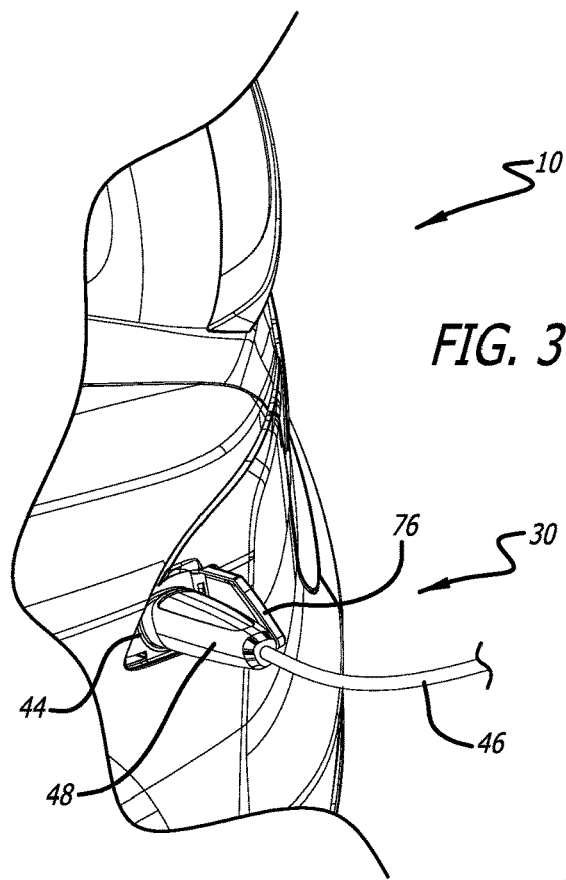
FIG. 3 is a partial perspective view of one embodiment of a charging system for a battery-powered vehicle, with the charger connected to the remote charging port.
Figure 4:
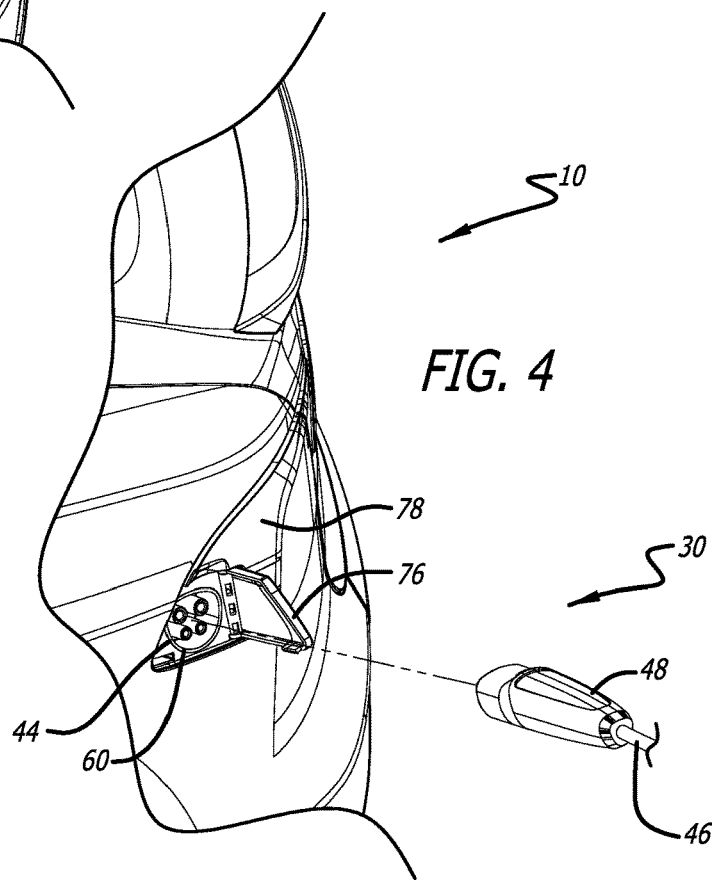
FIG. 4 is a partial perspective view of one embodiment of a charging system for a battery-powered vehicle, with the charger disconnected from the remote charging port.

In one embodiment the remote charging dock 44 is adjacent an exterior of the vehicle body 27, and the remote charging dock 44 has a remote charging plug 60. As shown in FIGS. 3 and 4, preferably the remote charging plug 60 of the remote charging dock 44 is accessible from the outside of the vehicle 10, and in one embodiment preferably is positioned behind an openable door portion 76 of the rear tail light 78. Accordingly, a user can charge the battery 40 by plugging one end of the charger 46 into a wall outlet and the other end of the charger 46 into the remote charging dock 44. The remote charging dock 44 has a remote charging dock circuit board 45, also referred to as a first controller 45. Similarly, the charger 46 has a third controller 47, as explained above. The third controller 47 of the charger 46 is electrically connected to the first controller 45 of the remote charging dock 44 when the charger 46 is connected or plugged into the remote charging dock.

In a preferred embodiment the remote charging dock 44 is electrically connected to the battery dock 42. In one embodiment, the first wiring harness 74 electrically connects the remote charging dock 44 with the battery dock 42. In one embodiment, the first wiring harness 74 includes a communication line 82 and power lines 83. Specifically, current is capable of flowing from the remote charging dock 44 to the battery dock 42 through the power lines 83 in the first wiring harness 74 connecting the remote charging dock 44 with the battery dock 42. Similarly, data is able to be transmitted between the first controller 45 (identified herein) in the remote charging dock 44 and the second controller 43 (identified herein) in the battery dock, through the first communication line 82 in the first wiring harness 74.

A communication line 80 is provided in the charger 46 between the charger circuit board and the terminals in the charger plug, and a separate communication line 82 is provided in the wiring harness 74 between the circuit board in the remote charging dock 44 and the battery dock 42. The communication lines 82 provide for transmitting data between the charger 46 and the battery 40. A communication protocol allows the charger 46 to communicate bi-directionally with the battery 40 in both the remote charging mode of FIG. 15 as well as the direct charging mode of FIG. 16. The charger 46 continually monitors a variety of parameters such as battery voltage, cell voltage, cell imbalance, charge time, etc., to provide for a safe and complete charging of the battery cells during charging. The first and second communication lines 80, 82 allow the fourth controller 57 to communicate with the second controller 43 in the battery dock 42 and the third controller 47 in the charger 46 when the battery 40 is connected to the battery dock 42.

Further, in a preferred embodiment the accelerator/pedal switch 28, and more specifically the accelerator controller 29, also referred to as the pedal switch controller 29, is electrically connected to the battery dock 42, and more specifically the battery dock controller 43, via a second wiring harness 75. In one embodiment, the second wiring harness 75 electrically connects the accelerator controller 29 with the second controller 43 in the battery dock 42. In one embodiment, the second wiring harness 75 includes a communication line 92 and power lines 93. Specifically, current/power is capable of flowing from the battery dock 42 to the accelerator/pedal switch controller 29 through the power lines 93 in the second wiring harness 75 connecting the accelerator/pedal switch controller 29 with the battery dock 42. Similarly, data is able to be transmitted between the accelerator/pedal switch controller 29 and the second controller 43 in the battery dock, through the communication line 92 in the second wiring harness 75. Further, current/power is also able to flow from the accelerator/pedal switch controller 29 and the electronics controller 95 through power lines 97.

In one embodiment, as shown in FIG. 15, current from a standard house outlet flows (i) through the charger 46, (ii) out the first set of terminals 50 in the charger plug 48, (iii) into the fourth set of terminals 62 in the remote charging plug 60, (iv) through the remote charging dock 44, (v) through the wiring harness 74, (vi) into the battery dock 42, (vii) into the battery dock plug 52, (viii) through the second set of terminals 54 in the battery dock plug 52, (ix) into the third set of terminals 58 in the battery plug 56, and (x) into the cells of the battery 40.

Figure 6:
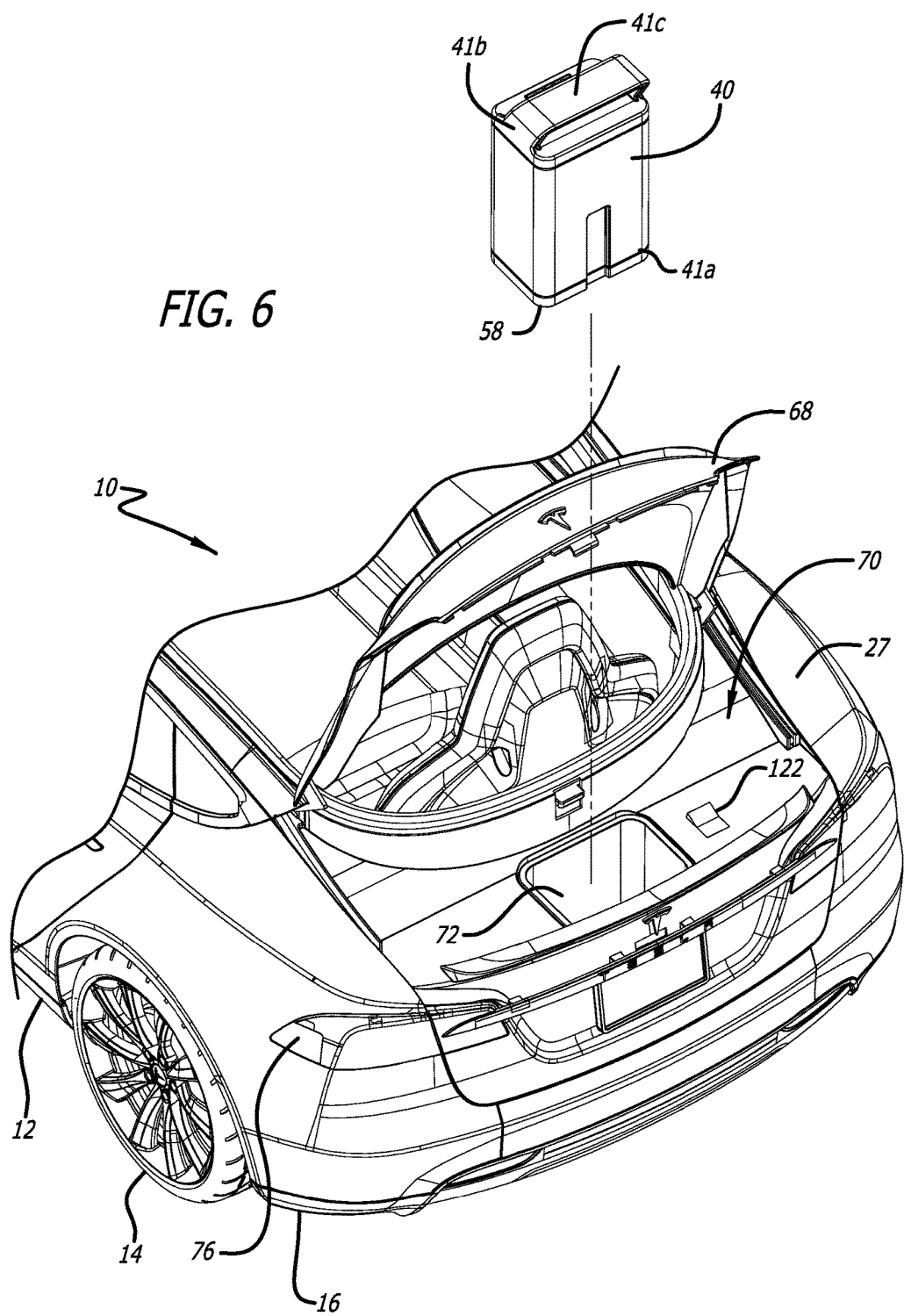
FIG. 6 is a top partial perspective view of the battery-powered vehicle of FIG. 5, with the battery removed from the battery port.
Figure 7:
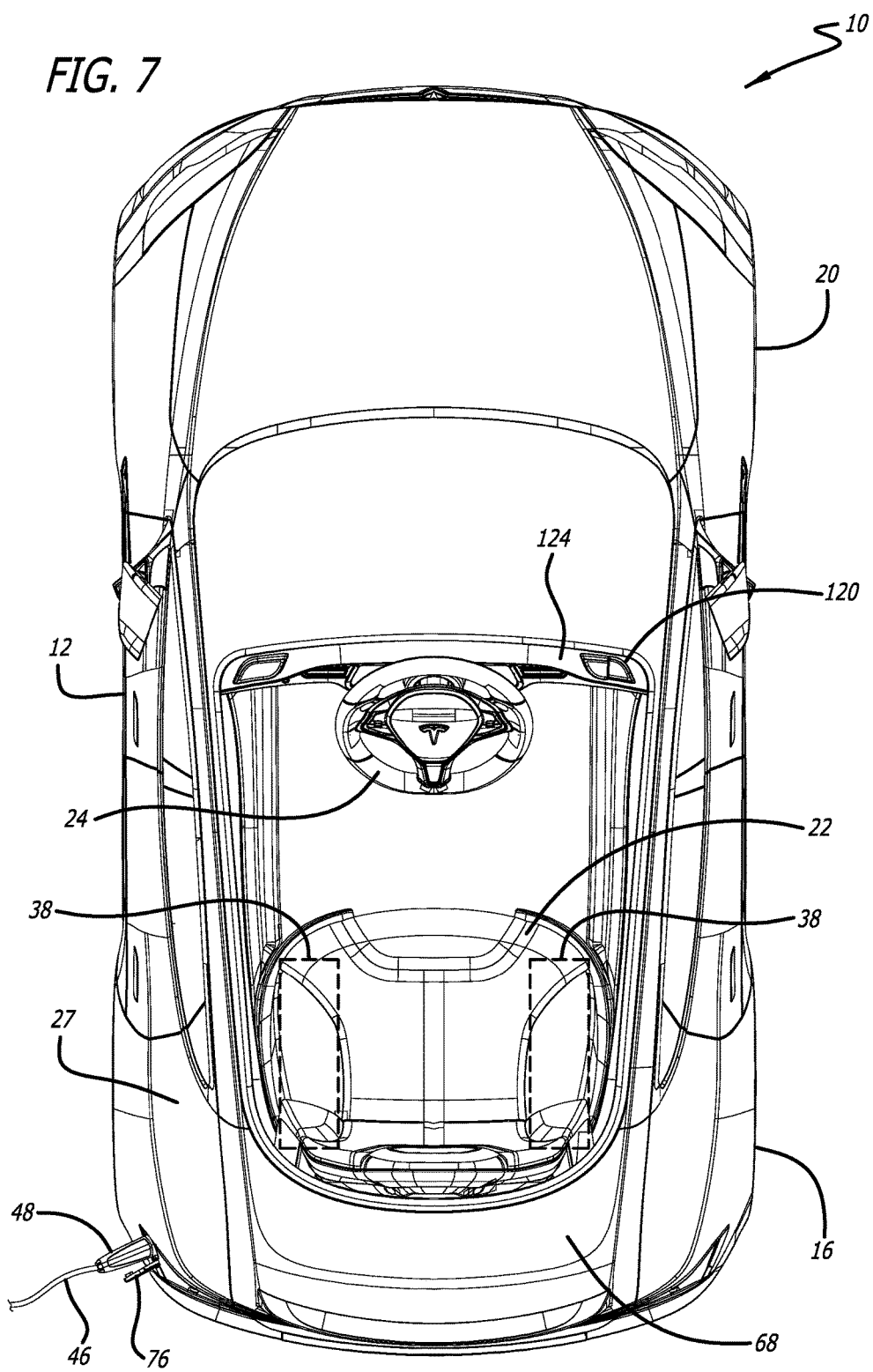
FIG. 7 is a top view of the battery-powered vehicle of FIG. 1.
Figure 16:
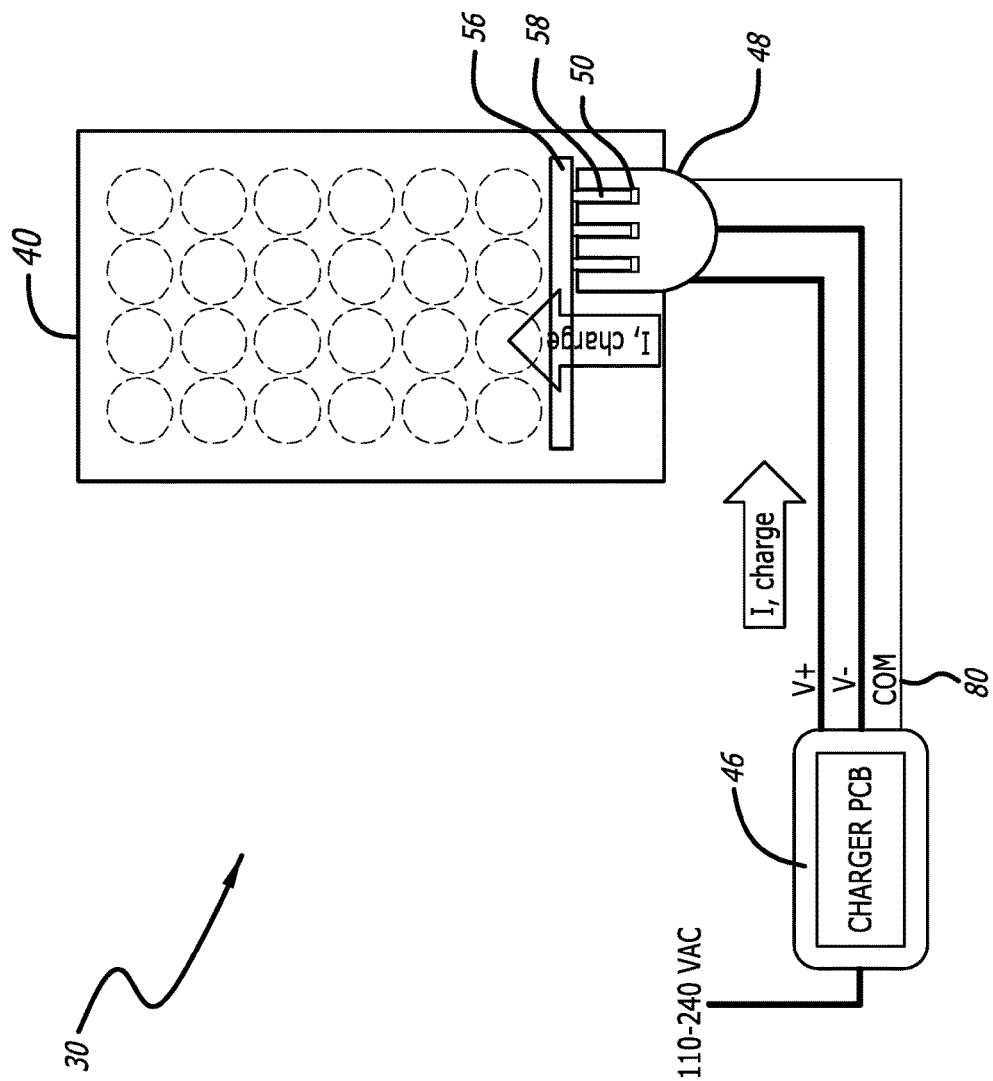
FIG. 16 is a schematic showing the charging system of FIG. 14, without the dashboard electronics system, with the battery disconnected from the battery dock and the charger disconnected from the charging dock.
Figure 17:
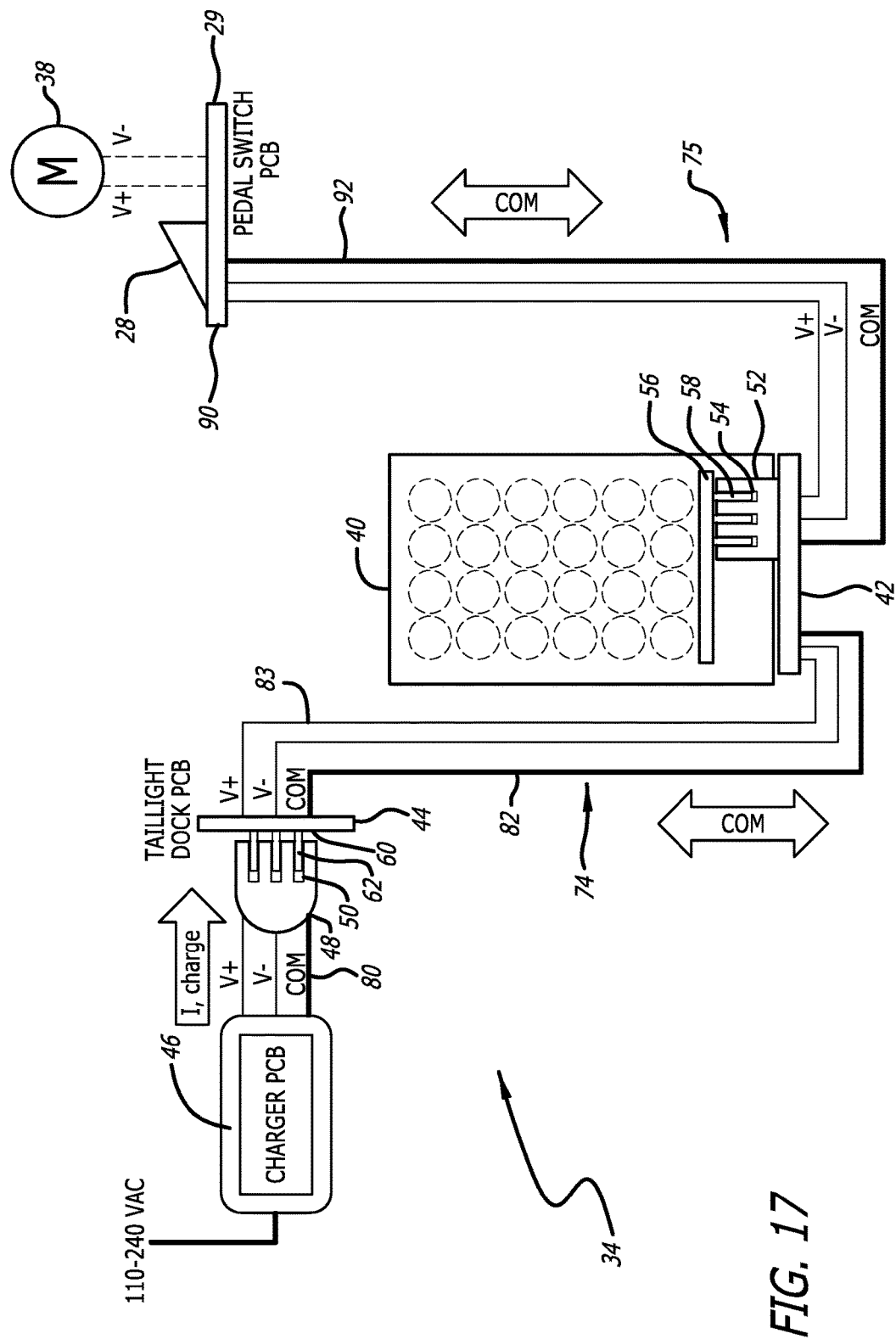
FIG. 17 is a schematic showing a communication system for a charging system for a battery-powered vehicle, according to one embodiment.

Alternately, as shown in FIGS. 6 and 16, the battery 40 for the battery-powered vehicle 10 may be charged by removing the battery 40 from the battery port 72 in the vehicle 10 and connecting the battery 40 directly to the charger 46. Accordingly, a user can charge the battery 40 by plugging one end of the charger 46 into a wall outlet and the other end of the charger 46 directly into the battery 40. In one embodiment, current from a standard house outlet flows (i) through the charger 46, (ii) out the first set of terminals 50 in the charger plug 48, (iii) into the third set of terminals 58 in the battery plug 56, and (iv) into the cells of the battery 40. Such alternate arrangements are possible because both the terminals of the battery plug and the remote charging plug have a similar terminal arrangement (a first terminal arrangement), and both the terminals of the charger plug and the terminals of the battery dock plug have a similar terminal arrangement (a second terminal arrangement), and the terminals of the first terminal arrangement are able to physically/mechanically and electrically mate with the terminals of the second terminal arrangement.

Referring to FIG. 17, in one embodiment the battery-powered vehicle 10 has a motor disable system 34. This system is utilized when the battery 40 is connected to the battery port 72 in the trunk 70 of the vehicle 10, and the battery 40 is being charged via the charger 46 through the remote charging dock 44, or alternately merely when the charger 46 is connected to the remote charging dock 44 of the vehicle 10. Because in this instance the vehicle 10 is essentially connected through the charger 46 to a power source, it would be undesirable for the motors 38 of the vehicle 10 to be operable to move the vehicle 10. Accordingly, the motor disabling system 34 is utilized. In one embodiment, the motor disabling system 34 includes a communication protocol that prevents the release of current from the battery 40 to the motors 38 when the charger 46 is connected to the remote charging dock 44. As shown in FIG. 17, and as explained herein, accelerator switch 28 has a circuit board/controller 29 that is electrically connected to the circuit board/controller 43 of the battery dock 42 via a communication line 92. The communication protocol of the motor disabling system 34 informs the controller 29 in the accelerator switch 28 as to whether the charger 46 is connected to the remote charging dock 44. If the charger 46 is detected as being connected to the remote charging dock 44, the controller 29 of the accelerate switch 28 or the second controller 43 in the battery dock 42 prevents the release of current to the motors 38, thereby not allowing the motors 38 to be operable to move the vehicle 10.

Figure 18:
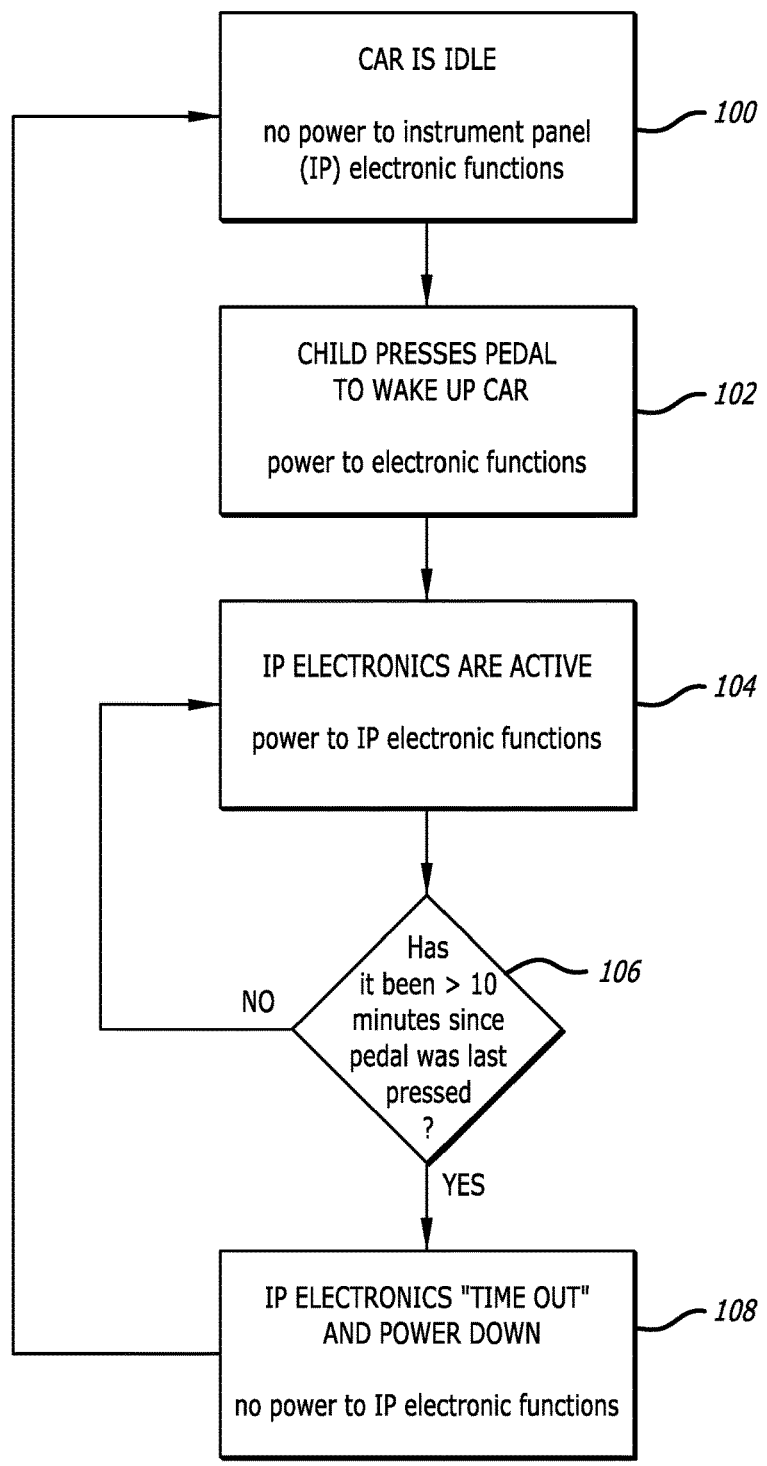
FIG. 18 is a flow chart of the logic for a wake-up function for electronics for a battery-powered vehicle, according to one embodiment.

The electronics wakeup system 36 for the vehicle 10 is shown schematically in FIGS. 14 and 18. The electronics wakeup system 36 generally allows a user to have the vehicle 10 power up various electronic components in the vehicle 10 by depressing a switch, such as the accelerator pedal switch 28, and for the electronic components to remain on for a period of time after the switch (e.g., the accelerator pedal switch 28) was last depressed. The shape or form of the accelerator switch/pedal switch is irrelevant and may take any shape or form, and may be hand operated, foot operated, or operated by other means. Various electronic components on the vehicle 10 may include a music player, such as a MP3 music player, speakers, a horn, lights, instrument panel, etc. The electronic components receive power from the vehicle's battery 40.

In one embodiment, the electronics wakeup system includes the accelerator switch 28, an accelerator switch controller 29, and the second wiring harness 75. A power line 97 connecting the electronics controller 95 is also required. In one embodiment, the power line 97 connects the electronics controller 95 with the accelerator controller 29 to allow current to flow between the accelerator controller 29 and the electronics controller 95. The electronics controller 95 may also be referred to as a dashboard controller 95 because several of the electrical components to that are controlled by the electronics controller 95 and which receive power from the electronics controller 95 will be located in the vehicle's dashboard. The electronics controller 95 is in electrical communication with the accelerator controller 29 and the electrical components. In one embodiment, by operating the switch (e.g., accelerator or pedal switch 28) current is provided from the battery 40 to the electronics controller 95. In one embodiment a circuit is closed to provide power from the battery 40 to the electronics controller 95 and the electronic devices through the power lines 97 from the accelerator controller 29 to the electronic controller 95. In one embodiment, as shown in step 100 in FIG. 18, when the vehicle 10 is idle or otherwise in standby mode, the circuit between the electronics on the vehicle 10 and the battery 40 is open and thus no current from the battery 40 reaches the electronic controller 95. However, as shown in step 102 in FIG. 18, when the user depresses the accelerator pedal 28 in the vehicle 10, the circuit between the electronic controller 95 on the vehicle 10 and the battery 40 closes, thereby "waking up" the vehicle 10 and allowing current to flow from the battery 40 to the electronics. At that point all electronics in the vehicle 10 will be operable as shown in step 104.

In step 106, a processor or controller of the vehicle 10, such as a controller having a timer, will monitor when the timing of when the accelerator switch is 28 depressed and how much time has elapsed since the switch was last depressed, and will keep the circuit closed between the battery 40 and the electronics for a period of time, such as ten minutes, after the accelerator switch 28 is depressed. In one embodiment, the accelerator controller 29 includes the timer. In an alternate embodiment the timer is provided in either the battery dock controller 43 or the electronics controller 95. In one embodiment, the timer calculates the time between actuations of the accelerator switch 28, and when the time between actuations of the accelerator switch 28 is greater than an electronics timer threshold, e.g., ten minutes, one of the accelerator controller 29, the battery dock controller 43 or the electronics controller 95 prevents the release of current to the electronics controller 95 until the accelerator switch 28 is actuated again. As shown in step 108, after the defined period of time, which in one embodiment is ten minutes, in one embodiment the vehicle's controller/processor will open the circuit between the battery 40 and the electronics, or otherwise prevent power to flow to the vehicle's electronics, thereby removing the supply of current from the battery 40 to the vehicle's electronics and essentially powering down all electronics in the vehicle 10. To once again power up the electronics, the user will have to depress or actuate the switch 28 as shown in step 102. Accordingly, no on/off switch is necessary for each electronic device on the vehicle 10, and no on/off switch is necessary to power up the vehicle 10 to either operate an electronic device on the vehicle 10 or to drive the vehicle 10. Preferably, a voltage regulator (not shown) is provided to step down the voltage from the accelerator controller 29 to the electronics controller 95. In one embodiment the voltage is stepped down from approximately 14.4 volts to about 4 volts.

As discussed above, the vehicle 10 may be driven in both the forward mode to propel the vehicle 10 forward, and in the reverse mode to propel the vehicle 10 backwards. In one embodiment, to assist in controlling whether the vehicle 10 is able to move in the forward mode or in the reverse mode and to determine how fast the vehicle 10 may traverse, the vehicle 10 may have a forward/reverse switching system 32, as shown in FIGS. 2, 7-13. Referring to these figures, in one embodiment the forward/reverse switching system 32 may comprise one or more of a forward/reverse switch assembly 120 (also referred to as a direction switch assembly 120), a speed control switch 122, the battery 40 and the motors 38. In one embodiment the forward/reverse switch assembly 120 includes, among other components described below, a toggle switch with two positions, a forward position and a reverse position. Alternately, the forward/reverse switch assembly 120 includes two separate buttons, a forward button 126 and a reverse button 128. Additionally, in one embodiment the speed control switch 122 includes a toggle switch with two positions, a high speed position and a low speed position, or alternately separate buttons. In one embodiment the direction switch assembly 120 is electrically connected between the battery 40 and the motor 38. The speed switch assembly 122 is preferably electrically connected between the direction switch assembly 120 and the motor(s) 38. The speed switch is preferably separate from the direction switch.

The vehicle 10 may be operated in a high speed mode and a low speed mode. However, in one embodiment the vehicle may not be operated in the high speed when in the reverse mode, regardless of whether the speed control switch 122 is set to the high speed mode. Put another way, when the reverse button of the direction switch assembly is actuated it removes control of a speed of the motor from the speed switch, and when the forward button of the direction switch assembly is actuated it causes the speed switch to control the speed of the motor. Accordingly, in one embodiment the vehicle may be operated in the high speed or the low speed when in the forward mode, but only in the low speed when in the reverse mode. In a preferred embodiment, the vehicle may be in high speed when the reverse direction is selected, but the vehicle will automatically place the vehicle in low speed for reversing. If the forward direction is selected next, the vehicle will once again convert to high speed automatically unless the low speed has been selected. In one embodiment where the vehicle 10 has two motors 38, when the vehicle 10 is in the high speed mode the vehicle 10 provides approximately 14.4 volts from the battery 40 to each motor 38, but when the vehicle 10 is in the low speed mode the vehicle 10 only provides approximately 7.2 volts from the battery 40 to each motor 38 (i.e., 14.4 volts in series to the two motors) to reduce the operating speed of each motor 38 in the low speed mode. If only one motor is utilized the system will provide less voltage to the one motor in the low speed mode.

In one embodiment the direction switch assembly 120 and the speed control switch 122 are provided in separate locations on the vehicle 10. For example, as shown in FIGS. 2 and 7, the forward/reverse switch assembly 120 may be provided in the cockpit of the vehicle, such as on the dashboard or instrument panel 124 of the vehicle 10. Similarly, in one embodiment the speed control switch 122 may be provided at a separate location from the forward/reverse switch assembly 120 and outside the cockpit of the vehicle 10, such as the trunk 70 of the vehicle 10. In such a configuration, the user is able to readily control whether the vehicle 10 is in the forward mode or the reverse mode by operating the forward/reverse switch assembly 120 located in the dashboard of the vehicle 10, while a parent or other supervisor is able to control whether the vehicle 10 is in the high speed or the low speed because the speed control switch 122 is in the trunk 70 of the vehicle 10 and is generally not accessible by a rider seated in the seat 22 of the vehicle 10. In one embodiment, the direction switch assembly is proximal the driver's seat in the vehicle body, and the speed switch is distal the driver's seat and generally not accessible by a rider seated in the driver's seat.

Figure 8:
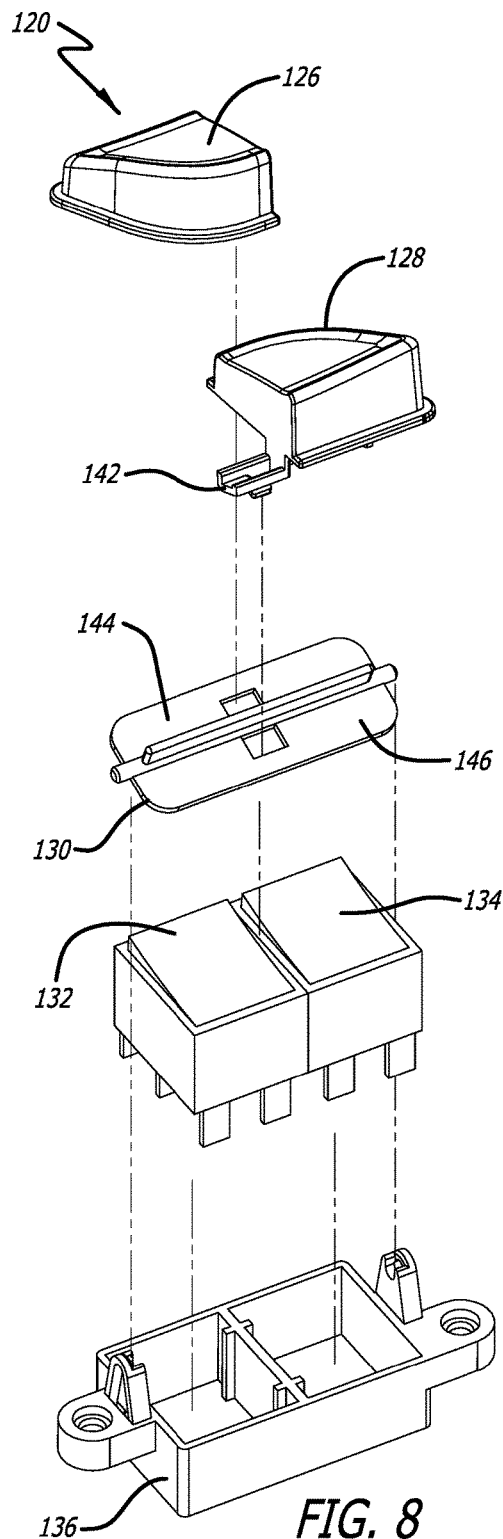
FIG. 8 is an exploded top perspective view of one embodiment of a forward/reverse switch assembly for a battery-powered vehicle.
Figure 9:
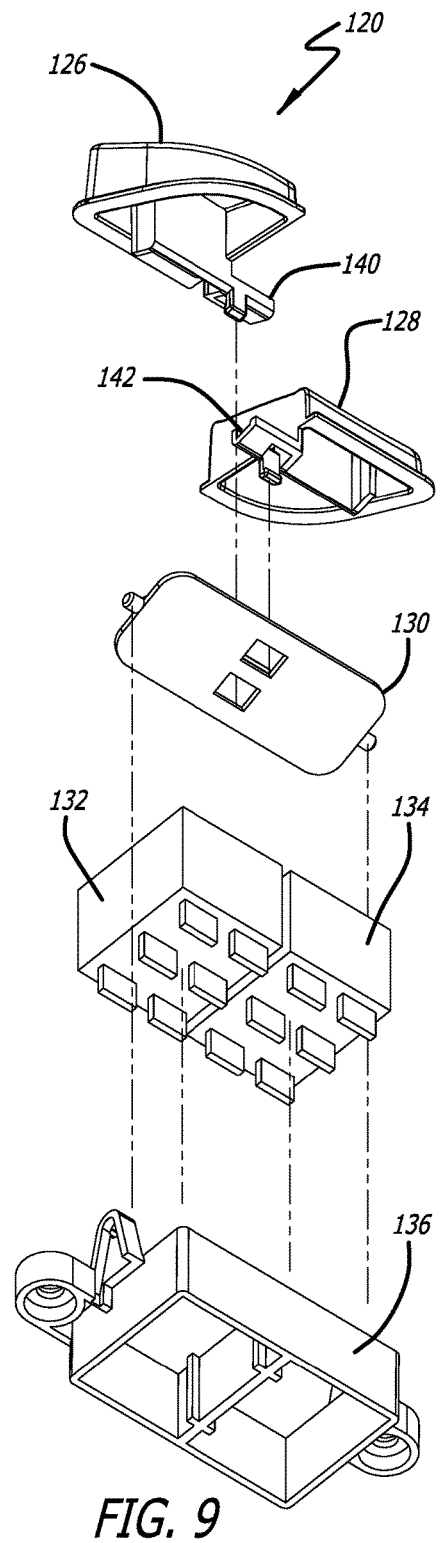
FIG. 9 is an exploded bottom perspective view of the forward/reverse switch assembly of FIG. 8.
Figure 10:
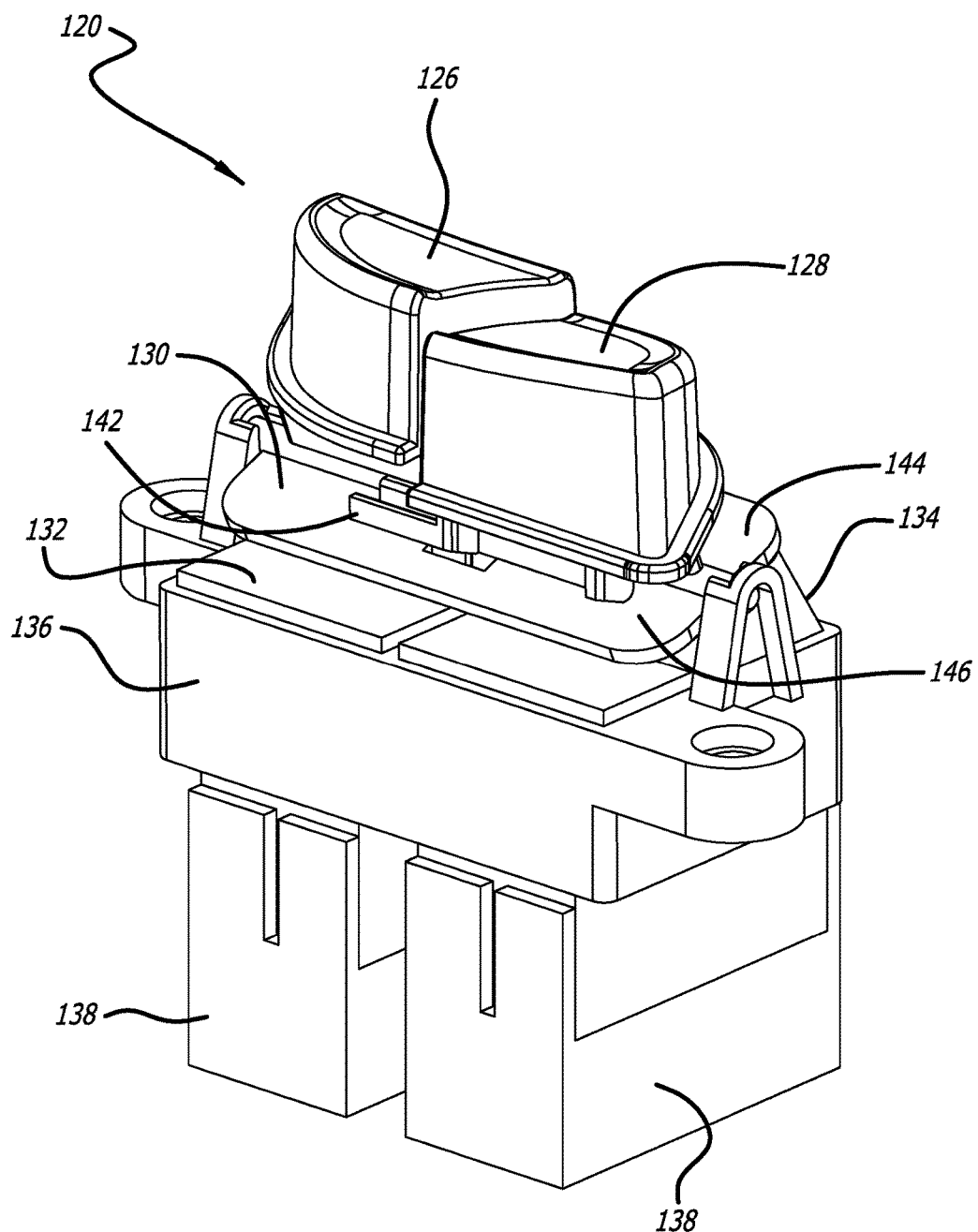
FIG. 10 is an assembled perspective view of the forward/reverse switch assembly of FIGS. 8 and 9.

One embodiment of the forward/reverse switch assembly 120 is shown in FIGS. 8-10. As shown, the forward/reverse switch assembly 120 may comprise a forward button 126, a reverse button 128, a pivotable rocker plate 130, a forward/reverse switch 132 (also referred to as a first switch 132), which may be a toggle switch such as, for example, a two position toggle switch, a second switch 134, which also may be a toggle switch such as, for example, a two position toggle switch, a switch housing 136 to pivotally retain the rocker plate 130 and also to retain the forward/reverse switch 132 and the second switch 134, and a wiring harness plug 138 to receive a wiring harness to connect, preferably separably, into the forward/reverse switch 132 and the second switch 134.

The rocker plate 130 is provided between the two buttons (i.e., the forward button 126 and the reverse button 128) and the two switches (i.e., the first switch 132 and the second switch 134) so that when one button is depressed, which could be either the forward button 126 or the reverse button 128, both switches 132 and 134 are operated simultaneously. In one embodiment as best shown in FIGS. 8-10, the forward button 126 has a forward button arm 140 on one side of the forward button 126, and the reverse button 128 has a reverse button arm 142 that is on the opposite side of the reverse button 128. As such, when the forward button 126 is depressed the forward button arm 140 engages a first side 144 of the rocker plate 130 to pivot the rocker plate 130 to a first orientation, and when the reverse button 128 is depressed the reverse button arm 142 engages an opposite second side 146 of the rocker plate 130 to pivot the rocker plate 130 to a second orientation.

In one embodiment, the first switch 132 determines the polarity of the first switch 132 which determines the polarity of the current provided to the motors 38 to place the vehicle 10 either in the forward mode or the reverse mode. For example, when the current is provided in one polarity the motors spin in one direction, and when the polarity of the current is reversed the motors will spin in the opposite direction, one direction being the forward direction and the other direction being the reverse direction. Put another way, when the first switch is in a first position the current provided to the motor has a first polarity, and when the first switch is in a second position the current provided to the motor has a second polarity opposite the first polarity. And, in one embodiment, the second switch 134, sometimes referred to as the reverse switch, determines the polarity of the second switch 134 to either allow current to flow through the speed control switch 122 (e.g., when the forward/reverse switch 132 is in the forward mode) or to bypass the speed control switch 122 (e.g., when the forward/reverse switch 132 is in the reverse mode) to require voltage to be sent to the motors 38 in series, thereby, in one embodiment, only providing approximately 7.2 volts per motor 38. In a preferred embodiment the first switch 132, the second switch 124 and the speed control switch 122 are each 6-pin switches, and by toggling the switches the middle two pins will either be connected with the first (or top) two pins, or last (or bottom) two pins as shown in FIGS. 11-13C. Accordingly, in one embodiment, a voltage is provided to the motors in parallel when the forward button is actuated and when the speed switch is in the high speed setting; a voltage is provided to the motors in series when the forward button is actuated and when the speed switch is in the low speed setting; and, a voltage is provided to the motors in series when reverse button is actuated regardless of the setting of the speed switch.

As shown in FIGS. 11 and 12, the forward button 126 is depressed. In this first orientation of the rocker plate 130 (i.e., when the forward button 126 is depressed) both the forward/reverse switch 132 and the second switch 134 are operated or toggled to a first position together. In one embodiment when the forward/reverse switch 132 is in the first position that switch is in the forward mode (e.g., positive polarity of the forward/reverse switch 132), and when the second switch 134 is in the first position the polarity of that switch is also positive such that an additional loop will be created to pass current through the speed control switch 122 to determine whether the motors 38 will be in high speed mode, as shown in FIG. 11, whereby voltage will be sent from the battery 40 to the motors 38 in parallel (i.e., approximately 14.4 volts per motor in one embodiment) or the low speed mode, as shown in FIG. 12, whereby voltage will be sent from the battery 40 to the motors 38 in series (i.e., approximately 7.2 volts per motor in one embodiment). As shown in FIGS. 11 and 12, in the forward mode the middle two pins of the first switch 132 will be electrically connected with the top two pins of the first switch 132. Further, in the high speed the middle two pins of the speed control switch 122 will be connected to the top two pins (shown in dashed line in FIG. 11), whereas in the low speed the middle two pins of the speed control switch 122 will be connected to the bottom two pins (shown in dashed line in FIG. 12). By joining the bottom 4 pins in the speed control switch 122 a loop is created that places the motors in series. The arrows in the FIGS. 11 and 12 (as well as FIGS. 13A-13C) show the direction of current flow, and the darker lines in these figures shown the flow of current (other than to dead ends). Accordingly, both ground and voltage are separately provided to the two motors (in parallel) in the circuit of FIG. 11, whereas ground and voltage are provided in series to the two motors in the circuit of FIG. 12 (shown schematically in FIG. 12 as a dashed line between motors M2 and M3).

Figure 13A:
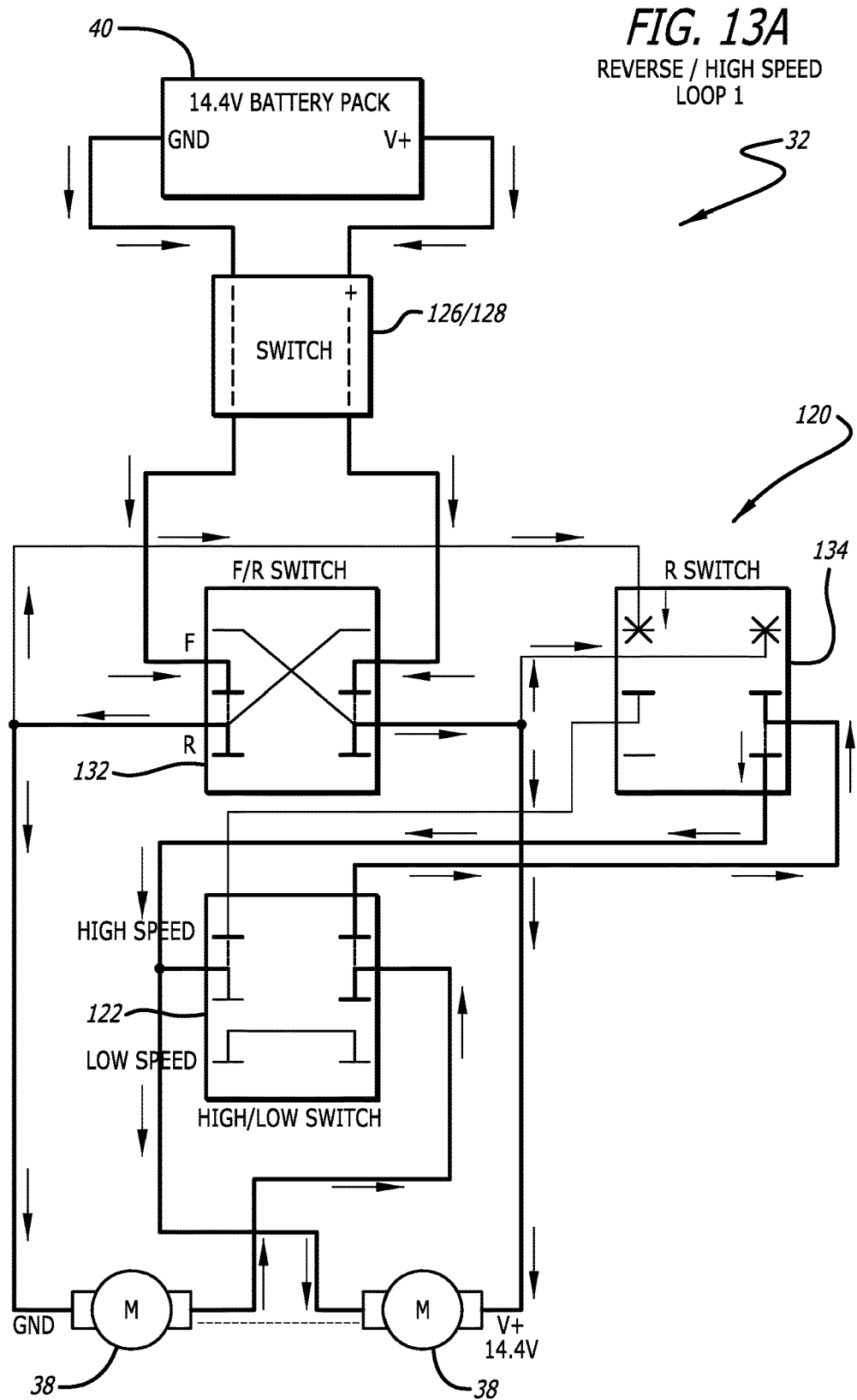
FIG. 13A is a schematic of a forward/reverse switching system connected to a power source and motors of a battery-powered vehicle, with the vehicle configured in the reverse direction and in the high gear, according to one embodiment.
Figure 13C:
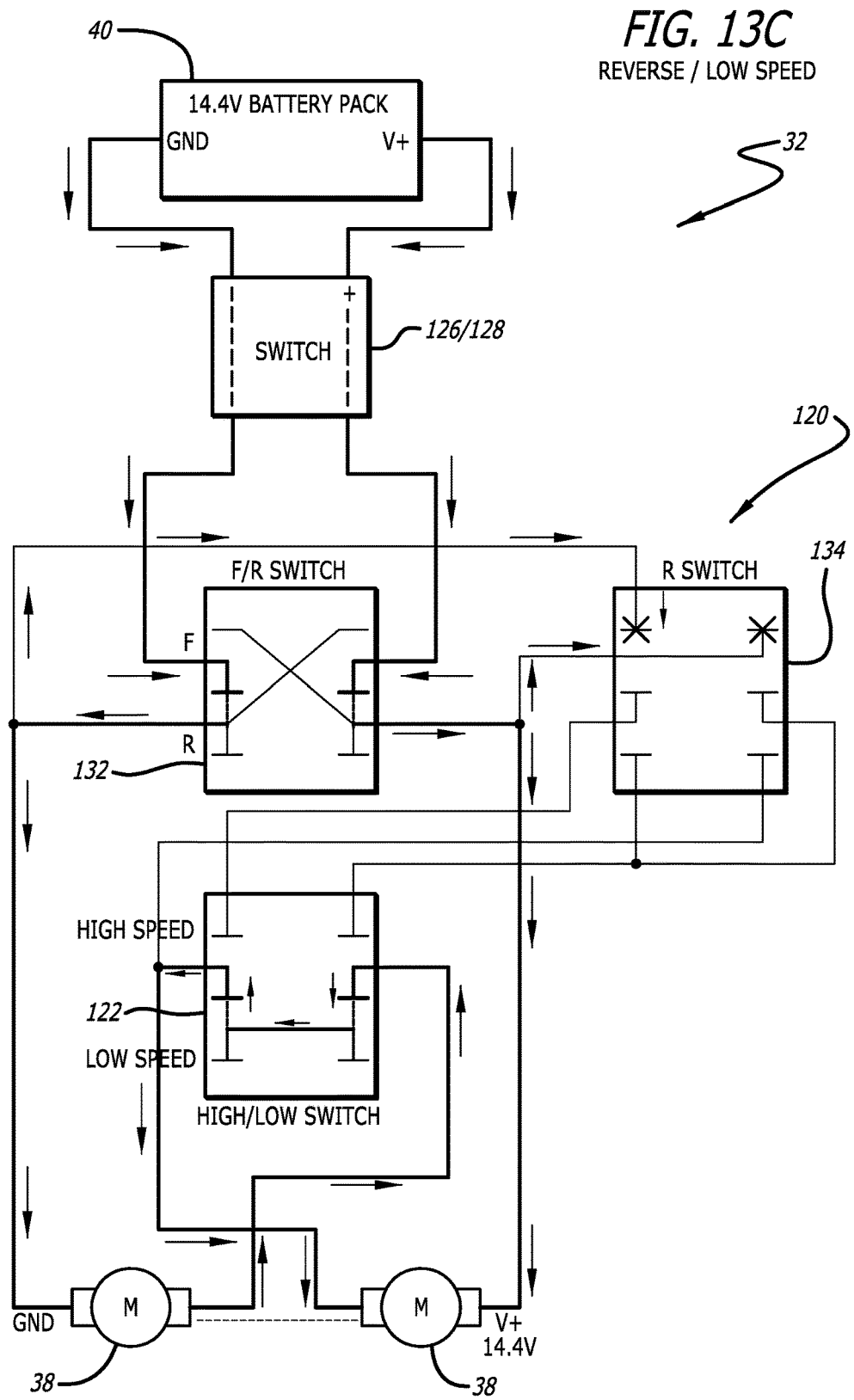
FIG. 13C is a schematic of a forward/reverse switching system connected to a power source and motors of a battery-powered vehicle, with the vehicle configured in the reverse direction and in the low gear, according to one embodiment.

Referring to FIGS. 13A-13C, schematics are provided showing the flow of current when the reverse button 128 is depressed on the first switch 120. Accordingly, in the second orientation of the rocker plate 130 (i.e., when the reverse button 128 is depressed) both the forward/reverse switch 132 and the second switch 134 are operated or toggled to a second position together. In one embodiment when the forward/reverse switch 132 is in the second position that switch is in the reverse mode (e.g., negative polarity of the forward/reverse switch 132), and when the second switch 134 is in the second position the polarity of that switch is also negative. However, as shown in FIGS. 13A-13C, when the polarity of the second switch 134 is reversed (e.g., in this embodiment negative) an additional loop is not created to pass current to the motors in parallel. Instead, the current always flows to connect the two motors 38 in series, which is the low speed. In the low speed approximately 7.2 volts are provided to each motor 38. Accordingly, in the reverse mode the vehicle 10 will always be in the low speed. Specifically, when the reverse button 128 is depressed and the speed control switch 122 is in the high mode, two different loops are created as shown in FIGS. 13A and 13B, both of which, however, place the motors in series as shown schematically by the dashed line between the motors M2 and M3. Additionally, as shown in FIG. 13C, when the reverse button 128 is depressed and the speed control switch 122 is in the low mode, a similar loop to that created in the forward/low speed of FIG. 12 is created as shown in FIG. 13C, which places the motors in series as shown schematically by the dashed line between the motors M2 and M3. The main difference between the schematic of FIG. 12 and the schematic of FIG. 13C is that the polarity of the current to the motors is reverse in the two figures so that in FIG. 12 the motors rotate in the forward direction, and in FIG. 13C the motors rotate in the opposite or reverse direction.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the disclosed embodiments may be embodied in other specific forms without departing from the spirit or central characteristics thereof. The present examples and embodiments, therefore, are to be considered in all respects as illustrative and not restrictive, and the disclosed embodiments are not to be limited to the details given herein. Accordingly, while the specific embodiments have been illustrated and described, numerous modifications come to mind without significantly departing from the spirit of the disclosure and the scope of protection is only limited by the scope of the accompanying Claims.

What is claimed is:

1. A battery-powered vehicle, comprising:
   a vehicle body;
   a plurality of wheels supporting the vehicle body;
   a battery dock having battery dock terminals and a battery dock controller;
   a battery having battery terminals that electrically and mechanically mate with the battery dock terminals;
   an accelerator switch and an accelerator switch controller;
   a power line to allow current to flow between the battery dock and the accelerator switch controller;
   a plurality of electrical components, and an electronics controller in electrical communication with the accelerator switch controller and the electrical components;
   a power line connecting the electronics controller with the accelerator switch controller to allow current to flow between the accelerator switch controller and the electronics controller;
   one of the accelerator switch controller and the electronics controller having a timer; and,
   wherein actuation of the accelerator switch operates to allow current to be provided to the electronics controller, wherein the timer calculates the time between actuations of the accelerator switch, and wherein when the time between actuations of the accelerator switch is greater than a timer threshold, one of the battery dock controller, the accelerator switch controller and the electronics controller prevents the release of current to the electronics controller until the accelerator switch is actuated again.

2. The battery-powered vehicle of claim 1, further comprising a communication line to allow data to be transmitted between the battery dock controller and the accelerator switch controller.

3. The battery-powered vehicle of claim 1, further comprising a motor connected to one of the plurality of wheels.

4. The battery-powered vehicle of claim 3, wherein the motor is electrically connected to the accelerator switch controller.

5. The battery-powered vehicle of claim 4, further comprising a charging dock electrically connected with the battery dock, a charger having a charger plug and associated charger terminals adapted to be removably connected to the charging dock, wherein the battery is configured to be charged in the battery port when the battery terminals electrically and mechanically mate with the battery dock terminals and wherein the charger plug is connected to the charging dock, and wherein one of the battery dock controller and the accelerator switch controller prevents the release of current to the motor when the charger is connected to the charging dock.

6. The battery-powered vehicle of claim 1, further comprising a charging dock electrically connected with the battery dock, a charger having a charger plug and associated charger terminals adapted to be removably connected to the charging dock, wherein the battery is configured to be charged in the battery port when the battery terminals electrically and mechanically mate with the battery dock terminals and wherein the charger plug is connected to the charging dock, and wherein the accelerator switch controller allows the release of current to the electronics controller when the charger is connected to the remote charging dock.

7. The battery-powered vehicle of claim 1, further comprising a voltage regulator that steps down a voltage from the accelerator switch controller to the electronics controller.

8. A battery-powered vehicle, comprising:
   a vehicle body;
   a plurality of wheels supporting the vehicle body;
   a battery dock having battery dock terminals and a battery dock controller;
   a battery having battery terminals that electrically and mechanically mate with the battery dock terminals;
   an accelerator switch and an accelerator switch controller;
   a power line to allow current to flow between the battery dock and the accelerator switch controller;

a plurality of electrical components, and an electronics controller in electrical communication with the accelerator switch controller and the electrical components;

a power line connecting the electronics controller with the accelerator switch controller to allow current to flow between the accelerator switch controller and the electronics controller; and, wherein a timer calculates the time between actuations of the accelerator switch, and wherein when the time between actuations of the accelerator switch is greater than a timer threshold, one of the battery dock controller, the accelerator switch controller and the electronics controller prevents a release of current to the electronics controller until the accelerator switch is actuated again.

9. The battery-powered vehicle of claim 8, wherein actuation of the accelerator switch operates to allow current to be provided to the electronics controller.

10. The battery-powered vehicle of claim 8, wherein the timer is incorporated into one of the accelerator switch controller, the battery dock controller and the electronics controller.

11. The battery-powered vehicle of claim 8, further comprising a communication line to allow data to be transmitted between the battery dock controller and the accelerator switch controller.

12. The battery-powered vehicle of claim 8, further comprising a motor connected to one of the plurality of wheels, the motor being electrically connected to the accelerator switch controller.

13. The battery-powered vehicle of claim 8, further comprising a charging dock electrically connected with the battery dock, a charger having a charger plug and associated charger terminals adapted to be removably connected to the charging dock, wherein the battery is configured to be charged in the battery port when the battery terminals electrically and mechanically mate with the battery dock terminals and wherein the charger plug is connected to the charging dock, and wherein the accelerator switch controller allows the release of current to the electronics controller when the charger is connected to the remote charging dock.

14. The battery-powered vehicle of claim 8, further comprising a voltage regulator that steps down a voltage from the accelerator switch controller to the electronics controller.

15. A battery-powered vehicle, comprising:
a vehicle body;
a plurality of wheels supporting the vehicle body;
a battery port in the vehicle body, the battery port having a battery dock and battery dock terminals, the battery port having a battery dock controller;
a removable and rechargeable battery having battery terminals that electrically and mechanically mate with the battery dock terminals;
an accelerator switch, an accelerator switch controller, and a wiring harness connecting the accelerator switch controller with the battery dock controller, wherein the wiring harness has (a) a power line to allow current to flow between the battery dock and the accelerator switch controller, and (b) a communication line to allow data to be transmitted between the battery dock controller and the accelerator switch controller;
the accelerator switch controller having a timer;
a plurality of electrical components, an electronics controller in electrical communication with the accelerator switch controller and the electrical components, and a power line connecting the electronics controller with the accelerator switch controller to allow current to flow between the accelerator switch controller and the electronic controller; and,
wherein the actuation of the accelerator switch operates to allow current to be provided from the battery to the electronics controller, wherein the timer calculates the time between actuations of the accelerator switch, and wherein when the time between actuations of the accelerator switch is greater than a threshold the accelerator switch controller prevents the release of current to the electronics controller until the accelerator switch is actuated again.

16. The battery-powered vehicle of claim 15, further comprising a motor connected to one of the plurality of wheels.

17. The battery-powered vehicle of claim 16, further comprising a charging dock electrically connected with the battery dock, a charger having a charger plug and associated charger terminals adapted to be removably connected to the charging dock, wherein the battery is configured to be charged in the battery port when the battery terminals electrically and mechanically mate with the battery dock terminals and wherein the charger plug is connected to the charging dock, and wherein one of the battery dock controller and the accelerator switch controller prevents the release of current to the motor when the charger is connected to the charging dock.

* * * * *